United States Patent
Choi et al.

(10) Patent No.: US 12,082,259 B2
(45) Date of Patent: Sep. 3, 2024

(54) COMMUNICATION METHOD AND DEVICE FOR REDUCED-CAPABILITY UE IN WIRELESS COMMUNICATION SYSTEM

(71) Applicant: Samsung Electronics Co., Ltd., Suwon-si (KR)

(72) Inventors: Seunghoon Choi, Suwon-si (KR); Youngbum Kim, Suwon-si (KR); Hyunseok Ryu, Suwon-si (KR); Sungjin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 228 days.

(21) Appl. No.: 17/404,241

(22) Filed: Aug. 17, 2021

(65) Prior Publication Data

US 2022/0061098 A1 Feb. 24, 2022

(30) Foreign Application Priority Data

Aug. 19, 2020 (KR) .................. 10-2020-0104251
Jan. 7, 2021 (KR) .................. 10-2021-0002235

(51) Int. Cl.
*H04W 74/0833* (2024.01)
*H04L 5/14* (2006.01)

(52) U.S. Cl.
CPC ........... *H04W 74/0833* (2013.01); *H04L 5/14* (2013.01)

(58) Field of Classification Search
CPC ......... H04W 74/0833; H04W 74/0891; H04L 5/14; H04L 5/0053; H04L 5/0094
See application file for complete search history.

(56) References Cited

U.S. PATENT DOCUMENTS 11,051,262 B2 * 6/2021 Qian ................. H04W 74/0833
2015/0215107 A1 7/2015 Siomina et al.
(Continued)

FOREIGN PATENT DOCUMENTS

KR 10-2019-0037049 A 4/2019
WO 2021/015498 A1 1/2021

OTHER PUBLICATIONS

Vivo, Guangdong Genius, "Reduced PDCCH monitoring for Reduced Capability NR devices", 3GPP TSG RAN WG1 #102-e, Aug. 17-28, 2020, R1-2005384, 9 pages.
(Continued)

*Primary Examiner* — Ajit Patel
*Assistant Examiner* — Wilfred Thomas

(57) ABSTRACT

An efficient communication method and device for a Reduced-capability UE using a half-duplex communication scheme in a wireless communication system. According to an embodiment, a method for performing a random access procedure by a reduced-capability user equipment (UE) in a wireless communication system comprises receiving, from a base station, configuration information including resource information for random access by the Reduced-capability UE, identifying whether there is a random access occasion overlapping a radio frequency (RF) switching gap in a time domain when the random access is performed, and when there is the random access occasion overlapping the RF switching gap, performing the random access procedure with the base station on a next random access occasion except for the overlapping random access occasion, based on the received resource information for random access.

16 Claims, 13 Drawing Sheets

(56) References Cited

U.S. PATENT DOCUMENTS

| | | | | |
|---|---|---|---|---|
| 2016/0183225 | A1* | 6/2016 | Ahn | H04W 72/51 |
| | | | | 370/329 |
| 2018/0192384 | A1* | 7/2018 | Chou | H04W 76/27 |
| 2019/0254076 | A1 | 8/2019 | Siomina et al. | |
| 2020/0112980 | A1* | 4/2020 | Ji | H04J 3/00 |
| 2020/0245367 | A1* | 7/2020 | Sun | H04W 74/0808 |
| 2021/0014902 | A1* | 1/2021 | Guo | H04W 56/001 |
| 2021/0050975 | A1* | 2/2021 | Rico Alvarino | H04W 8/22 |
| 2021/0240183 | A1* | 8/2021 | Yasuda | G05D 1/0022 |
| 2022/0086774 | A1* | 3/2022 | Qian | H04W 74/0833 |
| 2022/0330348 | A1* | 10/2022 | Wei | H04W 72/1263 |

OTHER PUBLICATIONS

LG Electronics, "Discussion on PDCCH monitoring for reduced capability NR devices", 3GPP TSG RAN WG1 #102-e, Aug. 17-28, 2020, R1-2006307, 3 pages.

Qualcomm Incorporated, "UE Complexity Reduction for NR RedCap Devices", 3GPP TSG-RAN WG1 Meeting #102, Aug. 17-28, 2020, R1-2006811, 19 pages.

International Search Report dated Nov. 8, 2021 in connection with International Patent Application No. PCT/KR2021/009927, 3 pages.

Written Opinion of the International Searching Authority dated Nov. 8, 2021 in connection with International Patent Application No. PCT/KR2021/009927, 4 pages.

Supplementary European Search Report dated Nov. 7, 2023, in connection with European Application No. EP21858493.6, 7 pages.

* cited by examiner

COMMUNICATION METHOD AND DEVICE FOR REDUCED-CAPABILITY UE IN WIRELESS COMMUNICATION SYSTEM

CROSS-REFERENCE TO RELATED APPLICATIONS

This application is based on and claims priority under 35 U.S.C. 119 to Korean Patent Application No. 10-2020-0104251 filed on Aug. 19, 2020, and Korean Patent Application No. 10-2021-0002235 filed on Jan. 7, 2021 in the Korean Intellectual Property Office, the disclosures of which are herein incorporated by reference in their entirety.

BACKGROUND

1. Field

The disclosure relates to a communication method and device for a reduced-capability (RedCap) UE in a wireless communication system, and more particularly, to a communication method and device when a RedCap UE performs a half-duplex operation.

2. Description of Related Art

In order to meet the demand for wireless data traffic soring since the 4G communication system came to the market, there are ongoing efforts to develop enhanced 5G communication systems or pre-5G communication systems. For the reasons, the 5G communication system or pre-5G communication system is called the beyond 4G network communication system or post LTE system. The 5G communication system defined by the 3GPP is called the new radio (NR) system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques have been discussed for the 5G communication system and adopted for NR systems: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, the Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. To implement the IoT, technology elements, such as a sensing technology, wired/wireless communication and network infrastructure, service interface technology, and a security technology, are required. There is a recent ongoing research for inter-object connection technologies, such as the sensor network, Machine-to-Machine (M2M), or the Machine-Type Communication (MTC). In the IoT environment, intelligent Internet Technology (IT) services may be offered that collect and analyze the data generated by the things connected with one another to create a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a Big data processing technique may be said to be an example of the convergence of the 5G and IoT technologies.

The 3GPP has started to discuss standardization of NR reduced capability (RedCap) UEs that may access a 5G communication system and transmit/receive data with reduced complexity to support technologies, such as of sensors, surveillance cameras, and smart watches.

SUMMARY

The disclosure provides an efficient communication method and device for a UE using a half-duplex communication scheme in a wireless communication system.

The disclosure provides a resource allocation method and device for a random access procedure in a UE using a half-duplex communication scheme in a wireless communication system.

The disclosure provides an efficient random access method and device for a RedCap UE using a half-duplex communication scheme in a wireless communication system.

According to an embodiment, a method for performing a random access procedure by a user equipment (UE) with a reduced-capability in a wireless communication system comprises receiving, from a base station, configuration information including resource information for random access of the UE, identifying whether there is a random access occasion overlapping a radio frequency (RF) switching gap in a time domain in case that the random access is performed, and in case that there is the random access occasion overlapping the RF switching gap, performing the random access procedure with the base station on a next random access occasion except for the overlapping random access occasion, based on the received resource information for the random access.

According to an embodiment, a UE with a reduced-capability in a wireless communication system comprises a transceiver and a processor configured to receive, from a base station through the transceiver, configuration information including resource information for random access of the UE, identify whether there is a random access occasion overlapping a radio frequency (RF) switching gap in a time domain in case that the random access is performed, and in case that there is the random access occasion overlapping the RF switching gap, perform a random access procedure with the base station, through the transceiver, on a next random access occasion except for the overlapping random access occasion, based on the received resource information for the random access.

According to an embodiment, a method for performing a random access procedure by a base station in a wireless communication system comprises transmitting configuration information including resource information for random access of a UE with a reduced-capability, and in case that there is a random access occasion overlapping a radio frequency (RF) switching gap, performing the random access procedure with the UE on a next random access occasion except for the overlapping random access occasion, based on the transmitted resource information for the random access.

According to an embodiment, a base station in a wireless communication system comprises a transceiver and a processor configured to transmit, through the transceiver, configuration information including resource information for random access by a UE with a reduced-capability, and when there is a random access occasion overlapping a radio frequency (RF) switching gap, perform a random access procedure with the UE, via the transceiver, on a next random access occasion except for the overlapping random access occasion, based on the transmitted resource information for the random access.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
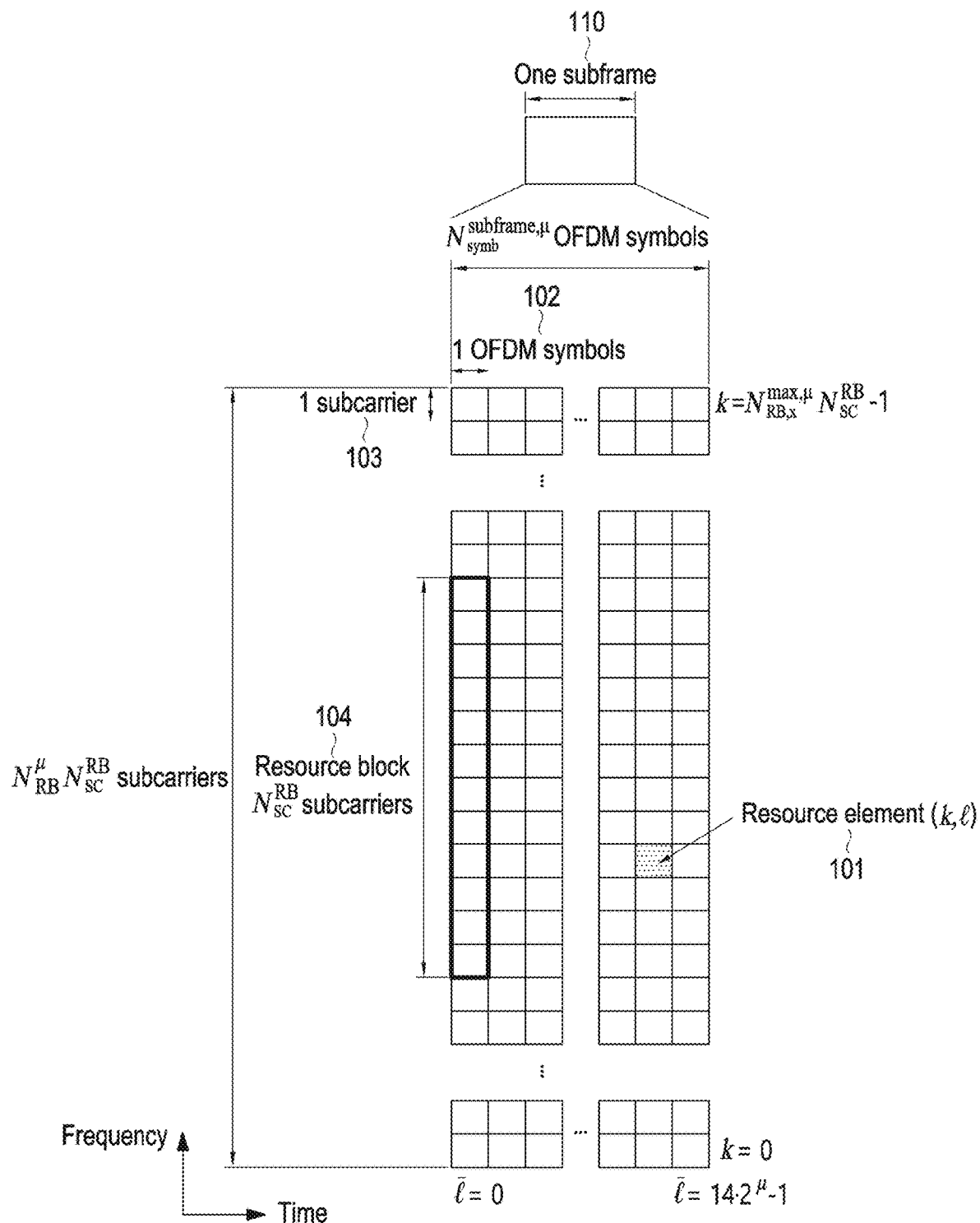
FIG. 1 illustrates a view of a basic structure of a time-frequency domain, which is a radio resource domain, in a wireless communication system according to an embodiment.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure are described in detail with reference to the accompanying drawings.

In describing embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflects the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification. When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

Hereinafter, the base station may be an entity allocating resource to the UE and may be at least one of a gNode B, eNodeB, Node B, base station (BS), access point (AP), wireless access unit, base station controller, or node over network. The UE may be at least one of a user equipment (UE), a mobile station (MS), a terminal, a cellular phone, a smart phone, a smart watch, a wearable device, a computer, and various multimedia devices capable of performing a communication function. In the disclosure, downlink (DL) refers to a wireless transmission path of signals transmitted from the base station to the UE, and uplink (UL) refers to a wireless transmission path of signals transmitted from the UE to the base station. Although the LTE or LTE-A systems may be described below as an example, embodiments of the disclosure may be applied to other communication systems having a similar technical background or channel shape. For example, 5G mobile communication technology (5G, new radio, NR) developed after LTE-A may be included therein, and 5G below may be a concept including legacy LTE, LTE-A and other similar services. Further, embodiments of the disclosure may be modified in such a range as not to significantly depart from the scope of the disclosure under the determination by one of ordinary skill in the art and such modifications may be applicable to other communication systems.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart.

Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments of the disclosure, a " . . . unit" may include one or more processors.

Hereinafter, embodiments of the disclosure are described in detail with reference to the accompanying drawings. Embodiments of the methods and devices proposed herein are described below in connection with IoT services (IWSN, surveillance cameras, or wearables), but embodiments of the disclosure are not limited thereto. A combination of all or some of one or more embodiments described herein may be used for, or applied to, random access methods and random access channel preamble repetitive transmission methods for other additional services. Further, modifications may be made to the embodiments of the disclosure in such a range as not to significantly depart from the scope of the disclosure under the determination by one of ordinary skill in the art.

When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), LTE-pro, 3GPP2 high rate packet data (HRPD), ultra-mobile broadband (UMB), and institute of electrical and electronics engineers (IEEE) 802.16e communication standards.

As a representative example of such broadband wireless communication system, the LTE system adopts orthogonal frequency division multiplexing (OFDM) for downlink and single carrier frequency division multiple access (SC-FDMA) for uplink. Uplink refers to a radio link through which the UE transmits data or control signals to the base station, and downlink refers to a radio link through which the base station transmits data or control signals to the UE. Such multiple access scheme allocates and operates time-frequency resources carrying data or control information per user not to overlap, i.e., to maintain orthogonality, to thereby differentiate each user's data or control information.

Post-LTE communication systems, e.g., 5G communication systems, are required to simultaneously support various requirements to freely reflect various requirements from users and service providers. Services considered for 5G communication systems include, e.g., enhanced mobile broadband (eMBB), massive machine type communication (MMTC), and ultra-reliability low latency communication (URLLC).

eMBB aims to provide a further enhanced data transmission rate as compared with LTE, LTE-A, or LTE-pro. For example, eMBB for 5G communication systems needs to provide a peak data rate of 20 Gbps on download and a peak data rate of 10 Gbps on uplink in terms of one base station. 5G communication systems also need to provide an increased user perceived data rate while simultaneously providing such peak data rate. To meet such requirements, various transmit (TX)/receive (RX) techniques, as well as multiple input multiple output (MIMO), may need to further be enhanced. While LTE adopts a TX bandwidth up to 20 MHz in the 2 GHz band to transmit signals, the 5G communication system employs a broader frequency bandwidth in a frequency band ranging from 3 GHz to 6 GHz or more than 6 GHz to meet the data rate required for 5G communication systems.

Further, mMTC is considered to support application services, such as IoT, in the 5G communication system. To efficiently provide IoT, mMTC is required to support massive UEs in the cell, enhance the coverage of the UE and the battery time, and reduce UE costs. IoT terminals are attached to various sensors or devices to provide communication functionality, and thus, it needs to support a number of UEs in each cell (e.g., 1,000,000 UEs/km$^2$). Since mMTC-supportive UEs, by the nature of service, are highly likely to be located in shadow areas not covered by the cell, such as the underground of a building, it requires much broader coverage as compared with other services that the 5G communication system provides. mMTC-supportive UEs, due to the need for being low cost and difficulty in frequently exchanging batteries, are required to have a very long battery life, e.g., 10 years to 15 years.

URLLC is a mission-critical, cellular-based wireless communication service. For example, URLLC may be considered for use in remote control for robots or machinery, industrial automation, unmanned aerial vehicles, remote health care, or emergency alert. This requires that URLLC provide very low-latency and very high-reliability communication. For example, URLLC-supportive services need to meet an air interface latency of less than 0.5 milliseconds simultaneously with a packet error rate of $10^5$ or less. Thus, for URLLC-supportive services, the 5G communication system is required to provide a shorter transmit time interval (TTI) than those for other services while securing reliable communication links by allocating a broad resource in the frequency band.

The three services of the 5G communication system (hereinafter interchangeable with the 5G system), i.e., eMBB, URLLC, and mMTC, may be multiplexed and transmitted in one system. In this case, the services may adopt different TX/RX schemes and TX/RX parameters to meet their different requirements.

The frame structure of the 5G system is described below in more detail with reference to the drawings. Hereinafter, as wireless communication systems to which the disclosure is applied, 5G systems are described as an example for convenience of description. However, embodiments of the disclosure may also be applied to post-5G systems or other communication systems in the same or similar manner.

FIG. 1 illustrates a view of a basic structure of a time-frequency domain, which is a radio resource domain, in a wireless communication system according to an embodiment.

In FIG. 1, the horizontal axis represents the time domain, and the vertical axis represents the frequency domain. A basic unit of a resource in the time and frequency domain is a resource element (RE) 101, which may be defined as one OFDM symbol (or discrete Fourier transform spread OFDM (DFT-s-OFDM) symbol) 102 on the time axis, and as one subcarrier 103 on the frequency axis. $N_{sc}^{RB}$ (e.g., 12) consecutive REs, which represent the number of subcarriers per resource block (RB) in the frequency domain, may constitute resource block (RB) 104. $N_{symb}^{subframe}$ consecutive OFDM symbols, which represent the number of symbols per subframe in the time domain, may constitute one subframe 110. For a more detailed description of the resource structure in the 5G system, refer to the TS 38.211 section 4 standard.

Figure 2:
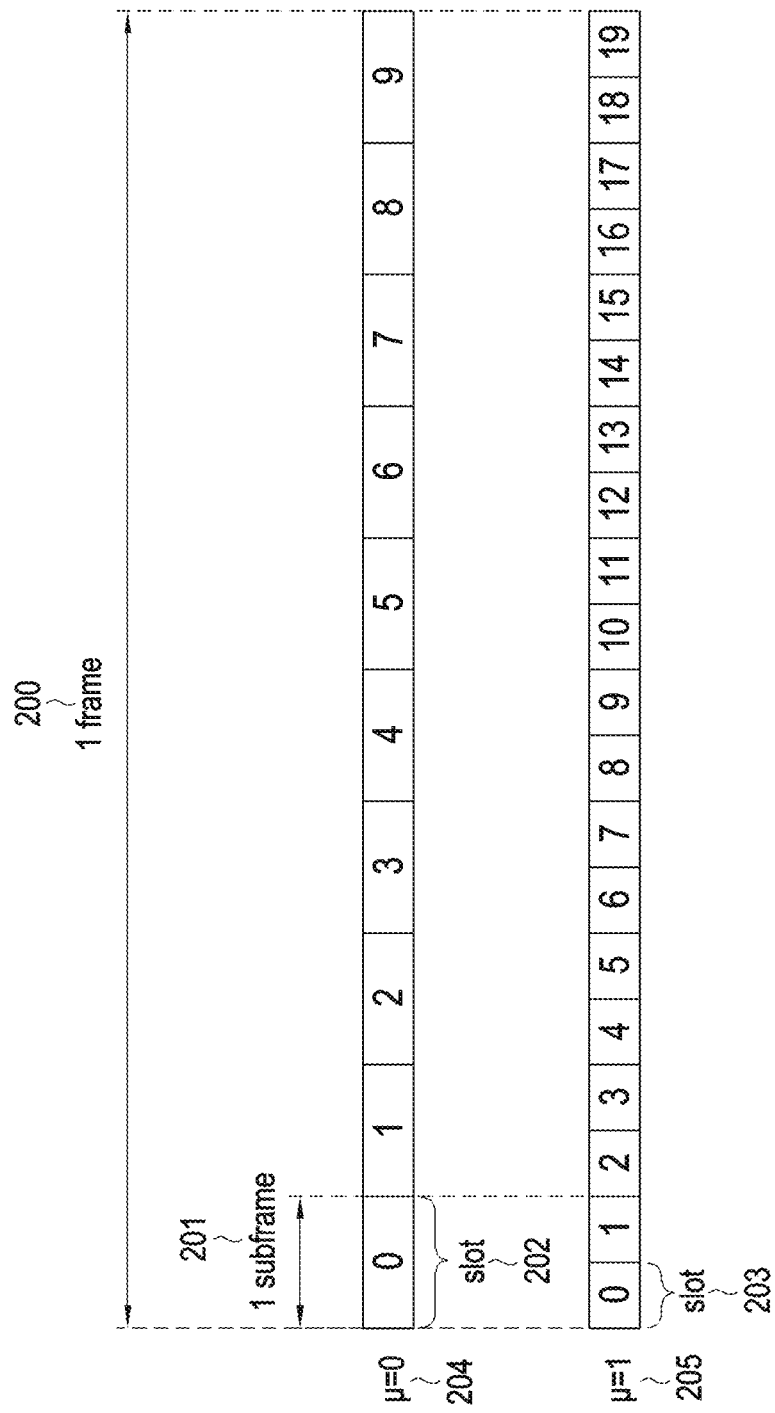
FIG. 2 illustrates a view of a slot structure considered in a wireless communication system according to an embodiment.

FIG. 2 illustrates a view of a slot structure considered in a wireless communication system according to an embodiment.

FIG. 2 illustrates example structures of a frame 200, a subframe 201, and slots 202 and 203. One frame 200 may be defined as 10 ms. One subframe 201 may be defined as 1 ms, and thus, one frame 200 may consist of a total of 10 subframes 201. One slot 202 or 203 may be defined as 14 OFDM symbols (that is, the number ($N_{symb}^{slot}$) of symbols per slot=14). One subframe 201 may be composed of one or more slots 202 and 203, and the number of slots 202 and 203 per subframe 201 may differ depending on (204 or 205), which is a set value for the subcarrier spacing.

In the example of FIG. 2, a slot structure of μ=0 (204) and a slot structure of μ=1 (205) are shown as the set subcarrier spacing values. When μ=0 (204), one subframe 201 may consist of one slot 202, and when μ=1 (205), one subframe 201 may consist of two slots (203). In other words, according to the set subcarrier spacing value μ, the number ($N_{slot}^{subframe,\mu}$) of slots per subframe may vary, and accordingly, the number ($N_{slot}^{frame,\mu}$) of slots per frame may differ. According to each subcarrier spacing μ, ($N_{slot}^{subframe,\mu}$ and $N_{slot}^{frame,\mu}$ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 1-continued

| μ | $N_{symb}^{slot}$ | $N_{slot}^{frame,\mu}$ | $N_{slot}^{subframe,\mu}$ |
|---|---|---|---|
| 2 | 14 | 40 | 4 |
| 3 | 14 | 80 | 8 |
| 4 | 14 | 160 | 16 |
| 5 | 14 | 320 | 32 |

In the 5G wireless communication system, a synchronization signal block (which may be interchangeably used with SSB, SS block, or SS/PBCH block) may be transmitted for initial access of the UE. The synchronization signal block may include a primary synchronization signal (PSS), a secondary synchronization signal (SSS), and a physical broadcast channel (PBCH). In the initial access phase in which the UE accesses the system, the UE first obtains downlink time and frequency domain synchronization from a synchronization signal from the base station through a cell search and performs the cell ID. The synchronization signal may include a PSS and an SSS. The UE receives the PBCH, transmitting a master information block (MIB), from the base station, obtaining system information related to transmission and reception, such as system bandwidth or related control information, and basic parameter values. Based on the information, the UE may perform decoding on a physical downlink control channel (PDCCH) and a physical downlink shared channel (PDSCH), obtaining the system information block (SIB). Thereafter, the UE exchanges identification-related information for the base station and the UE through a random access step and undergoes registration and authentication to thus initially access the network.

A cell initial access procedure of a UE in a 5G wireless communication system is described below in more detail with reference to the drawings.

The synchronization signal is a reference signal for cell search, and, when the synchronization signal is transmitted, a subcarrier spacing suitable for a channel environment, such as phase noise, for each frequency band is applied to the synchronization signal. In the 5G system, the base station may transmit a plurality of synchronization signal blocks according to the number of analog beams to be operated. For example, a PSS and an SSS may be mapped over 12 RBs and transmitted, and a PBCH may be mapped over 24 RBs and transmitted. Described below is a structure in which a synchronization signal and a PBCH are transmitted in a 5G communication system.

Figure 3:
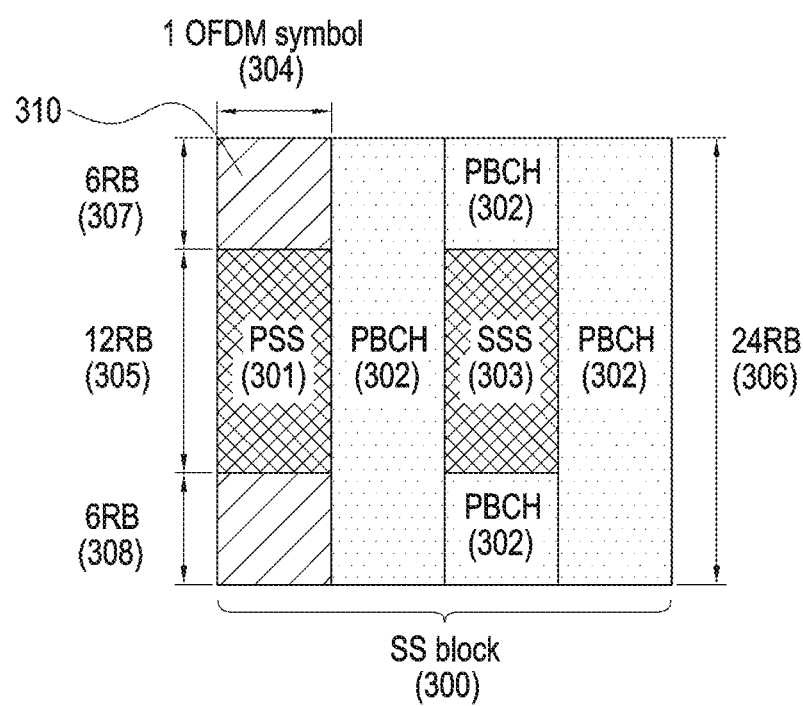
FIG. 3 illustrates a view of a synchronization signal block considered in a wireless communication system according to an embodiment.

FIG. 3 illustrates a view of a synchronization signal block considered in a wireless communication system according to an embodiment.

According to FIG. 3, a synchronization signal block (SS block) 300 includes a PSS 301, an SSS 303, and broadcast channels (PBCH) 302.

As illustrated in FIG. 3, the synchronization signal block 300 is mapped to four OFDM symbols 304 on the time axis. The PSS 301 and the SSS 303 may be transmitted in 12 RBs 305 on the frequency axis and in first and third OFDM symbols on the time axis, respectively. In the 5G system, a total of 1,008 different cell IDs may be defined and, depending on the physical layer ID of the cell, the PSS 301 may have three different values, and the SSS 303 may have 336 different values. The UE may obtain one of (336×3=)1,008 cell IDs, as a combination, by detection on the PSS 301 and the SSS 303. This may be represented as Equation 1.

$$N_{ID}^{cell} = 3N_{ID}^{(1)} + N_{ID}^{(2)} \qquad \text{[Equation 1]}$$

where $N^{(1)}_{ID}$ may be estimated from the SSS 303 and has a value between 0 and 335. $N^{(2)}_{ID}$ may be estimated from the PSS 301 and has a value between 0 and 2. The UE may estimate the cell ID, i.e., $N^{cell}_{ID}$, by a combination of $N^{(1)}_{ID}$ and $N^{(2)}_{ID}$.

The PBCH 302 may be transmitted in the resource including 24 RBs 306 on the frequency axis and 6RBs 307 and 308 on both sides of each of the second and fourth OFDM symbols, except for the intermediate 12 RBs where the SSS 303 is transmitted, on the time axis. Various system information, called the MIB, may be transmitted in the PBCH 302. More specifically, the MIB may include information as set forth in Table 2 below. The PBCH payload and the PBCH demodulation reference signal (DMRS) may include additional information below. For a more detailed description of the MIB in the 5G system, a reference may be made to the TS 38.331 standard.

TABLE 2

| MIB := | SEQUENCE { |
|---|---|
| systemFrameNumber | BIT STRING (SIZE (6)), |
| subCarrierSpacingCommon | ENUMERATED (scs15or60, scs30or120), |
| ssb-SubcarrierOffset | INTEGER (0..15), |
| dmrs-TypeA-Position | ENUMERATED (pos2, pos3}, |
| pdcch-ConfigSIB1 | PDCCH-ConfigSIB1, |
| cellBarred | ENUMERATED (barred, notBarred), |
| intraFreqReselection | ENUMERATED (allowed, notAllowed}, |
| spare | BIT STRING (SIZE (1)) |
| } | |

Synchronization signal block information: indicates the offset of the frequency domain of the synchronization signal block through 4 bits (ssb-SubcarrierOffset) in the MIB. The index of the synchronization signal block including the PBCH may be indirectly obtained through decoding of the PBCH DMRS and PBCH. More specifically, in a frequency band below 6 GHz, 3 bits obtained through decoding of the PBCH DMRS indicate the synchronization signal block index and, in a frequency band above 6 GHz, 6 bits in total, including 3 bits obtained through decoding of the PBCH DMRS and 3 bits included in the PBCH payload and obtained by PBCH decoding may indicate the synchronization signal block index including the PBCH.

PDCCH information: indicates the subcarrier spacing of the common downlink control channel through 1 bit (subCarrierSpacingCommon) in the MIB and indicates the control resource set (CORESET) and the search space (SS) through 8 bits (pdcch-ConfigSIB1).

System frame number (SFN): 6 bits (systemFrameNumber) in the MIB are used to indicate a part of the SFN. The 4 least significant bits (LSBs) of the SFN are included in the PBCH payload, and the UE may indirectly obtain it through PBCH decoding.

Timing information in radio frame: 1 bit (half frame) obtained through PBCH decoding and included in the PBCH payload and the synchronization signal block index described above. The UE may indirectly identify whether the synchronization signal block is transmitted in the first or second half frame of the radio frame.

Since the transmission bandwidth (12 RBs 305) of the PSS 301 and the SSS 303 and the transmission bandwidth (24 RBs 306) of the PBCH 302 are different from each other, the first OFDM symbol where the PSS 301 is transmitted in the PBCH (302) transmission bandwidth has 6 RBs 307 and 308 on both sides except the intermediate 12 RBs where the PSS 301 is transmitted, and the region may be used to transmit other signals or may be empty.

All synchronization signal blocks may be transmitted using the same analog beam. In other words, the PSS 301, the SSS 303, and the PBCH 302 may all be transmitted through the same beam. Since the analog beam, by its nature, cannot be applied differently on the frequency axis, the same analog beam is applied to all the RBs on the frequency axis RBs within a specific OFDM symbol to which a specific analog beam is applied. In other words, all of the four OFDM symbols in which the PSS 301, the SSS 303, and the PBCH 302 are transmitted may be transmitted using the same analog beam.

Figure 4:
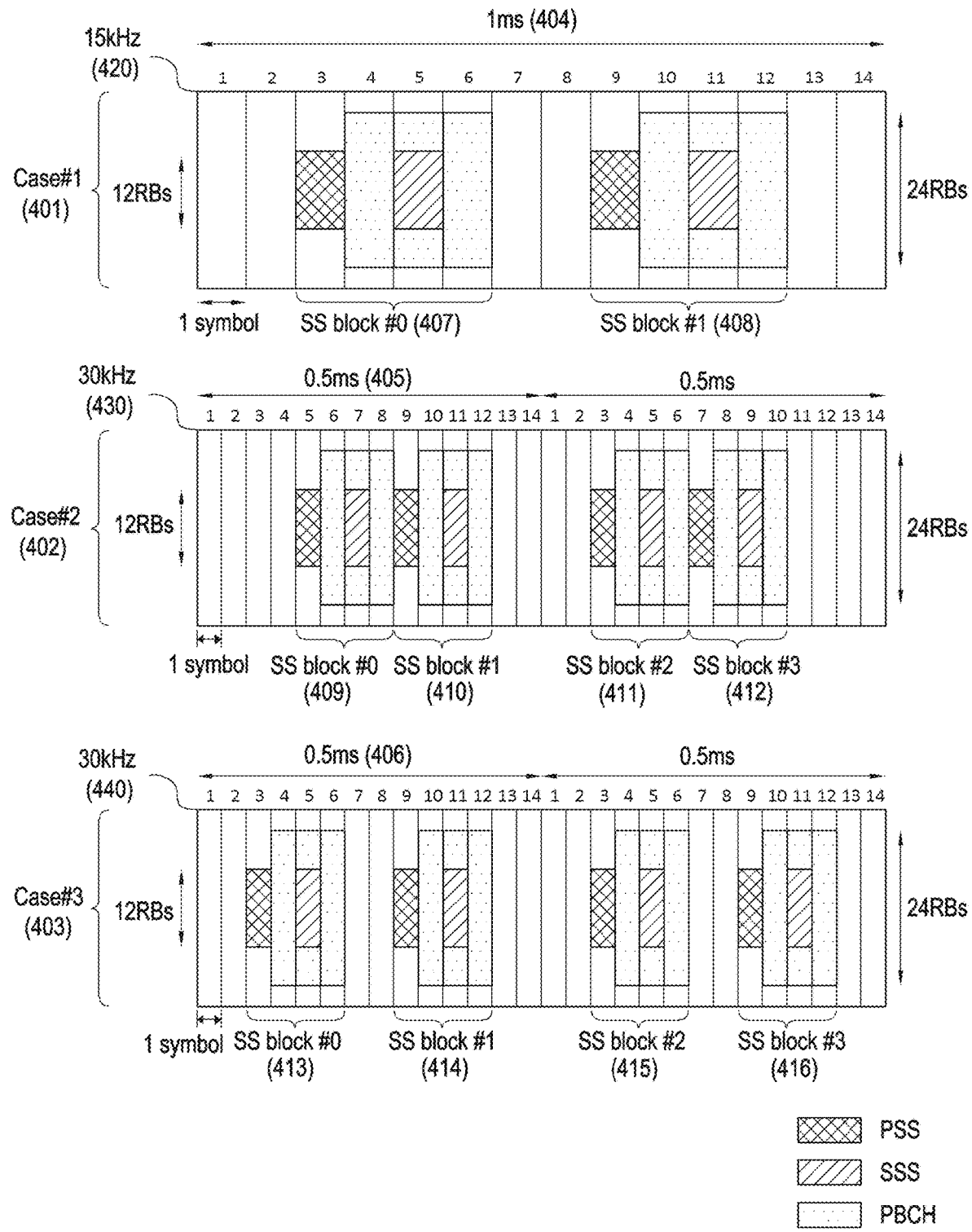
FIG. 4 illustrates a view of transmission cases of a synchronization signal block in a frequency band of 6 GHz or less considered in a wireless communication system according to an embodiment.

FIG. 4 illustrates a view of transmission cases of a synchronization signal block in a frequency band of 6 GHz or less considered in a communication system according to an embodiment.

In the 5G communication system, in a frequency band below 6 GHz, a subcarrier spacing (SCS) of 15 kHz (420) and a subcarrier spacing of 30 kHz (430 or 440) may be used for synchronization signal block transmission. In the 15 kHz subcarrier spacing, there is one transmission case (Case #1 (401)) for the synchronization signal block and, in the 30 kHz subcarrier spacing, there may be two transmission cases for the synchronization signal block (Case #2 (402) and Case #3 403).

In FIG. 4, in case #1 (401) of the 15 kHz subcarrier spacing (420), up to two synchronization signal blocks may be transmitted within 1 ms (404) (or, when 1 slot consists of 14 OFDM symbols, it corresponds to a length of 1 slot). In the example of FIG. 4, synchronization signal block #0 407 and synchronization signal block #1 408 are shown. For example, the synchronization signal block #0 407 may be mapped to four consecutive symbols from the third OFDM symbol, and the synchronization signal block #1 408 may be mapped to four consecutive symbols from the ninth OFDM symbol.

Different analog beams may be applied to the synchronization signal block #0 407 and the synchronization signal block #1 408. The same beam may be applied to all of the 3rd to 6th OFDM symbols to which the synchronization signal block #0 407 is mapped, and the same beam may be applied to all of the 9th to 12th OFDM symbols to which the synchronization signal block #1 408 is mapped. In the 7th, 8th, 13th, and 14th OFDM symbols to which no synchronization signal block is mapped, an analog beam to be used may be freely determined under the determination of the base station.

In FIG. 4, in case #2 (402) of the 30 kHz subcarrier spacing (430), up to two synchronization signal blocks may be transmitted within 0.5 ms (405) (or, when 1 slot consists of 14 OFDM symbols, it corresponds to a length of 1 slot), and accordingly, up to four synchronization signal blocks may be transmitted within 1 ms (or, if 1 slot consists of 14 OFDM symbols, it corresponds to a length of 2 slots). FIG. 4 illustrates an example in which synchronization signal block #0 409, synchronization signal block #1 410, synchronization signal block #2 411, and synchronization signal block #3 412 are transmitted within 1 ms (i.e., two slots). In this case, the synchronization signal block #0 409 and the synchronization signal block #1 410 may be mapped from the 5th OFDM symbol and the 9th OFDM symbol, respectively, of the first slot, and the synchronization signal block #2 411 and the synchronization signal block #3 412 may be mapped from the 3rd OFDM symbol and the 7th OFDM symbol, respectively, of the second slot.

Different analog beams may be applied to the synchronization signal block #0 409, the synchronization signal block #1 410, the synchronization signal block #2 411, and the synchronization signal block #3 412. The same analog beam may be applied to the 5th to 8th OFDM symbols of the first slot in which the synchronization signal block #0 409 is transmitted, the 9th to 12th OFDM symbols of the first slot in which the synchronization signal block #1 410 is transmitted, the 3rd to 6th symbols of the second slot in which the synchronization signal block #2 411 is transmitted, and the 7th to 10th symbols of the second slot in which the synchronization signal block #3 412 is transmitted. In the OFDM symbols to which no synchronization signal block is mapped, an analog beam to be used may be freely determined under the determination of the base station.

In FIG. 4, in case #3 (403) of the 30 kHz subcarrier spacing (440), up to two synchronization signal blocks may be transmitted within 0.5 ms (406) (or, when 1 slot consists of 14 OFDM symbols, it corresponds to a length of 1 slot), and accordingly, up to four synchronization signal blocks may be transmitted within 1 ms (or, if 1 slot consists of 14 OFDM symbols, it corresponds to a length of 2 slots). FIG. 4 illustrates an example in which synchronization signal block #0 413, synchronization signal block #1 414, synchronization signal block #2 415, and synchronization signal block #3 416 are transmitted within 1 ms (i.e., two slots). In this case, the synchronization signal block #0 413 and the synchronization signal block #1 414 may be mapped from the 3rd OFDM symbol and the 9th OFDM symbol, respectively, of the first slot, and the synchronization signal block #2 415 and the synchronization signal block #3 416 may be mapped from the 3rd OFDM symbol and the 9th OFDM symbol, respectively, of the second slot.

Different analog beams may be used for the synchronization signal block #0 413, the synchronization signal block #1 414, the synchronization signal block #2 415, and the synchronization signal block #3 416. As described above in connection with examples, the same analog beam may be used in all four OFDM symbols in which each synchronization signal block is transmitted, and which beam is used in OFDM symbols to which no synchronization signal block is mapped may be freely determined by the base station.

Figure 5:
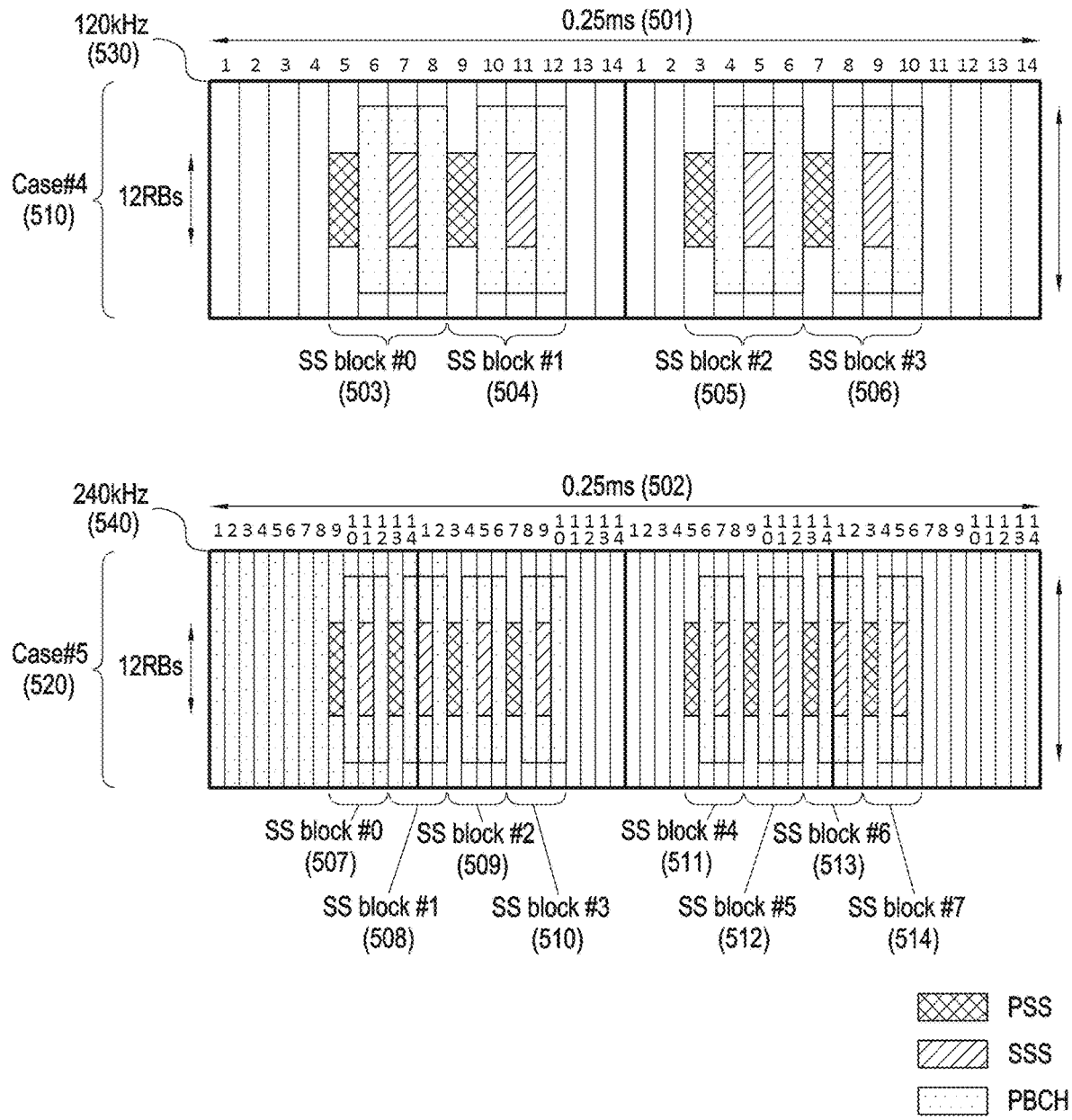
FIG. 5 illustrates a view of transmission cases of a synchronization signal block in a frequency band of 6 GHz or higher considered in a wireless communication system according to an embodiment.

FIG. 5 illustrates a view of transmission cases of a synchronization signal block in a frequency band of 6 GHz or higher considered in a wireless communication system according to an embodiment.

In the 5G communication system, in a frequency band of 6 GHz or higher, the sub-carrier spacing of 120 kHz (530) as in the example of case #4 (510) and the sub-carrier spacing of 240 kHz (540) as in the example of case #5 (520) may be used for synchronization signal block transmission.

In case #4 (510) of the 120 kHz subcarrier spacing (530), up to four synchronization signal blocks may be transmitted within 0.25 ms (501) (or, when 1 slot consists of 14 OFDM symbols, it corresponds to a length of 2 slots). FIG. 5 illustrates an example in which synchronization signal block

0 503, synchronization signal block #1 504, synchronization signal block #2 505, and synchronization signal block #3 506 are transmitted within 0.25 ms (i.e., two slots). In this case, the synchronization signal block #0 503 and the synchronization signal block #1 504 may be mapped to four consecutive symbols from the 5th OFDM symbol and to four consecutive symbols from the 9th OFDM symbol, respectively, of the first slot, and the synchronization signal block #2 505 and the synchronization signal block #3 506 may be mapped to four consecutive symbols from the 3rd OFDM symbol and to four consecutive symbols from the 7th OFDM symbol, respectively, of the second slot.

As described above in connection with the above embodiments, different analog beams may be used for the synchronization signal block #0 503, the synchronization signal block #1 504, the synchronization signal block #2 505, and the synchronization signal block #3 506. The same analog beam may be used in all four OFDM symbols in which each synchronization signal block is transmitted, and which beam is used in OFDM symbols to which no synchronization signal block is mapped may be freely determined by the base station.

In case #5 (520) of the 240 kHz subcarrier spacing (540), up to eight synchronization signal blocks may be transmitted within 0.25 ms (502) (or, when 1 slot consists of 14 OFDM symbols, it corresponds to a length of 4 slots). FIG. 5 illustrates an example in which synchronization signal block #0 (507), synchronization signal block #1 (508), synchronization signal block #2 (509), synchronization signal block #3 (510), synchronization signal block #4 (511), synchronization signal block #5 (512), synchronization signal block #6 (513), and synchronization signal block #7 (514) are transmitted within 0.25 ms (i.e., 4 slots). In this case, the synchronization signal block #0 (507) and the synchronization signal block #1 (508) may be mapped to four consecutive symbols from the 9th OFDM symbol and to four consecutive symbols from the 13th OFDM symbol, respectively, of the first slot, the synchronization signal block #2 (509) and the synchronization signal block #3 (510) may be mapped to four consecutive symbols from the 3rd OFDM symbol and to four consecutive symbols from the 7th OFDM symbol, respectively, of the second slot, the synchronization signal block #4 (511), the synchronization signal block #5 512, and the synchronization signal block #6 (513) may be mapped to four consecutive symbols from the 5th OFDM symbol, to four consecutive symbols from the 9th OFDM symbols, and to four consecutive symbols from the 13th OFDM symbol, respectively, of the third slot, and the synchronization signal block #7 514 may be mapped to four consecutive symbols from the 3rd OFDM symbol of the fourth slot.

As described in connection with the above embodiment, the synchronization signal block #0 (507), the synchronization signal block #1 (508), the synchronization signal block #2 (509), the synchronization signal block #3 (510), the synchronization signal block #4 (511), the synchronization signal block #5 (512), the synchronization signal block #6 (513), and the synchronization signal block #7 (514) may use different analog beams. The same analog beam may be used in all four OFDM symbols in which each synchronization signal block is transmitted, and which beam is used in OFDM symbols to which no synchronization signal block is mapped may be freely determined by the base station.

Figure 6:
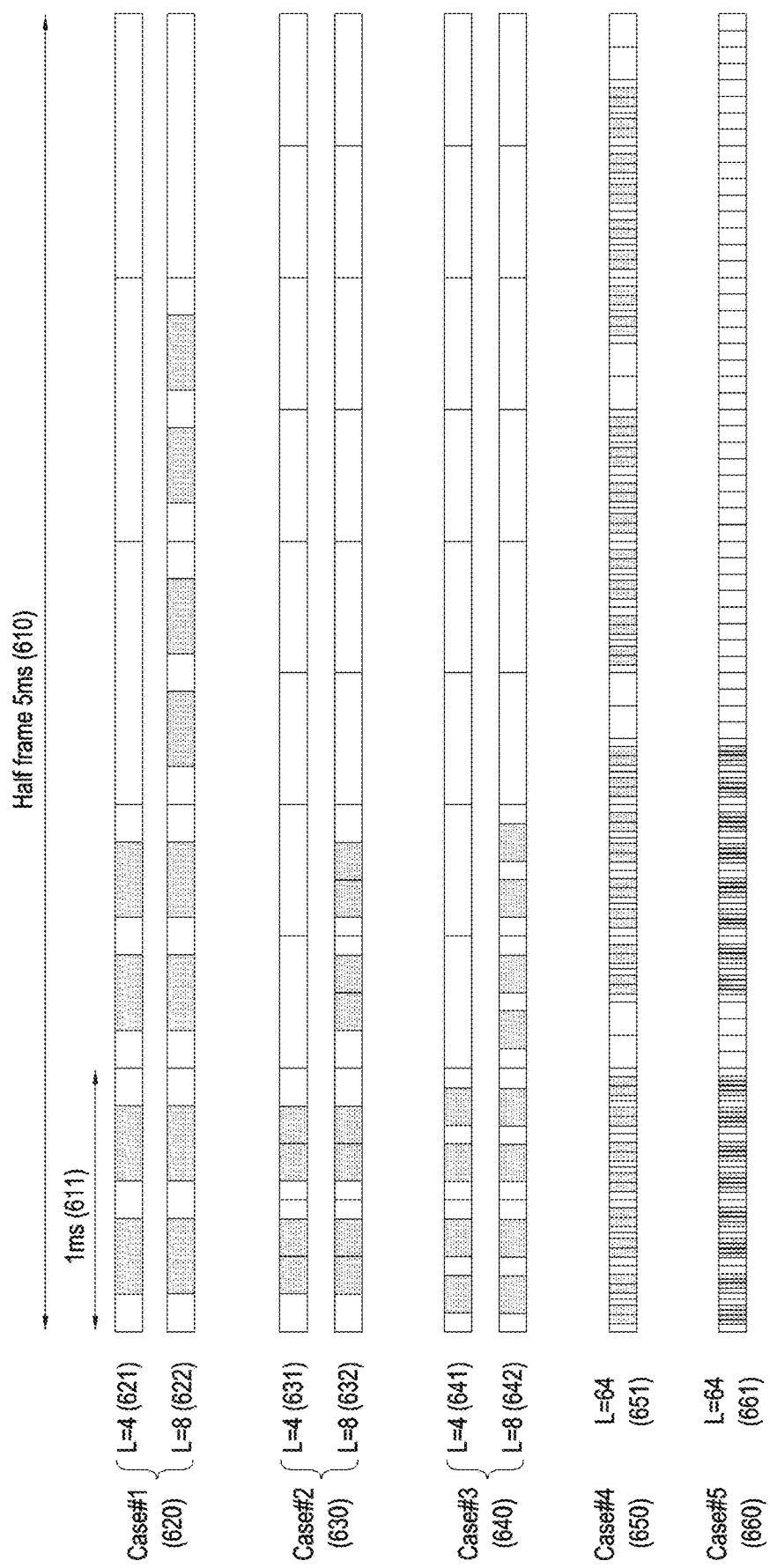
FIG. 6 illustrates a view of transmission cases of a synchronization signal block according to a subcarrier spacing within 5 ms in a wireless communication system according to an embodiment.

FIG. 6 illustrates a view of transmission cases of a synchronization signal block according to a subcarrier spacing within 5 ms in a wireless communication system according to an embodiment. In the 5G communication system, the synchronization signal block may be transmitted periodically every 5 ms (corresponding to 5 subframes or half frames, 610).

In a frequency band of 3 GHz or less, up to four synchronization signal blocks may be transmitted within 5 ms (610). Up to 8 synchronization signal blocks may be transmitted in a frequency band above 3 GHz and below 6 GHz. In a frequency band above 6 GHz, up to 64 synchronization signal blocks may be transmitted. As described above, the subcarrier spacings of 15 kHz and 30 kHz may be used at frequencies below 6 GHz.

In the example of FIG. 6, in case #1 (401) of the 15 kHz subcarrier spacing consisting of one slot of FIG. 4, in a frequency band of 3 GHz or less, synchronization signal blocks may be mapped to the first slot and the second slot so that up to four synchronization signal blocks 621 may be transmitted, and in a frequency band above 3 GHz and below 6 GHz, synchronization signal blocks may be mapped to the first, second, third, and fourth slots, so that up to eight synchronization signal blocks 622 may be transmitted (620). In case #2 (402) or case #3 (403) of the 30 kHz subcarrier spacing consisting of two slots in FIG. 4, in a frequency band below 3 GHz, synchronization signal blocks may be mapped starting from the first slot, so that up to four synchronization signal blocks 631 and 641 may be transmitted, and in a frequency band above 3 GHz and below 6 GHz, synchronization signal blocks may be mapped starting from the first and third slots, so that up to eight synchronization signal blocks 632 and 642 may be transmitted (630, 640).

The subcarrier spacings of 120 kHz and 240 kHz may be used at frequencies above 6 GHz. In the example of FIG. 6, in case #4 (510) of the 120 kHz subcarrier spacing consisting of two slots of FIG. 5, in a frequency band above 6 GHz, synchronization signal blocks may be mapped starting from the 1st, 3rd, 5th, 7th, 11th, 13th, 15th, 17th, 21st, 23rd, 25th, 27th, 31st, 33rd, 35th, and 37th slots so that up to 64 synchronization signal blocks 651 may be transmitted (650). In the example of FIG. 6, in case #5 (520) of the 240 kHz subcarrier spacing consisting of 4 slots of FIG. 5, in a frequency band above 6 GHz, synchronization signal blocks may be mapped starting from the 1st, 5th, 9th, 13rd, 21st, 25th, 29th, and 33rd slots so that up to 64 synchronization signal blocks 661 may be transmitted (660).

Meanwhile, the UE may obtain the SIB after decoding the PDCCH and the PDSCH based on the system information included in the received MIB. The SIB includes at least one of uplink cell bandwidth, random access parameters, paging parameters, or parameters related to uplink power control.

The 3GPP is discussing reduced capability (RedCap) UE operating based on NR. In the disclosure, upon initial cell access to a cell (or a base station), a RedCap UE obtains cell synchronization by receiving the synchronization signal block as in the embodiment of FIG. 4 or FIG. 5 and determines whether the cell supports the RedCap UE by obtaining the MIB or SIB or via a random access process. When it is determined that the cell supports the RedCap UE, capability information about the bandwidth size supported by the RedCap UE in the cell, whether half-duplex communication is supported, and the number of transmission or reception antennas equipped (or supported), may be transmitted to the base station, informing the base station that the UE attempting to access is a RedCap UE. Thereafter, the UE may finish the random access process and proceed to an RRC connected mode for transmitting/receiving data to/from the cell.

In general, the UE may form a radio link with the network through a random access procedure based on the system information and synchronization with the network obtained in the cell search process of the cell. For random access, a contention-based or contention-free scheme may be used. When the UE performs cell selection and reselection in the phase of initial access to the cell, a contention-based random access scheme may be used for the purpose of, e.g., switching from the RRC_IDLE (RRC idle) state to the RRC_CONNECTED (RRC connected) state. Contention-free random access may be used when downlink data arrives, in the case of handover, or in the case of re-establishing uplink synchronization for location measurement. Table 3 below illustrates conditions (events) under which a random access procedure is triggered in the 5G system. For details, refer to TS 38.300.

TABLE 3

Initial access from RRC_IDLE;
RRC Connection Re-establishment procedure;
DL or UL data arrival during RRC_CONNECTED when UL synchronisation status is "non-synchronised";
UL data arrival during RRC_CONNECTED when there are no PUCCH resources for SR available;
SR failure;
Request by RRC upon synchronous reconfiguration (e.g. handover);
Transition from RRC_INACTIVE;
To establish time alignment for a secondary TAG;
Request for Other SI;
Beam failure recovery.

Figure 7:
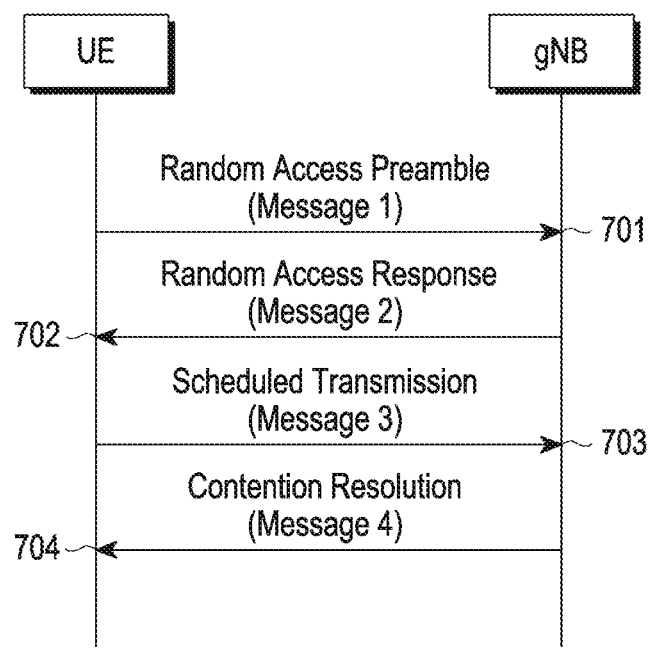
FIG. 7 illustrates a view of a four-step random access procedure in a wireless communication system according to an embodiment.

FIG. 7 illustrates a view of a random access procedure in a wireless communication system according to an embodiment. This illustrates a contention-based random access procedure.

Referring to FIG. 7, although not shown, the base station transmits a synchronization signal block as described in the above embodiments. In this case, the base station may periodically transmit the synchronization signal block using beam sweeping. For example, the base station transmits synchronization signal blocks including PSS/SSS (synchronization signal) and PBCH (broadcast channel) signals using up to 64 different beams for 5 ms, and a plurality of synchronization signal blocks may be transmitted using different beams. The UE detects (selects) the synchronization signal block having an optimal beam direction (e.g., a beam direction in which the received signal strength is highest or is larger than a predetermined threshold), and a preamble is transmitted using a physical random access channel (PRACH) associated with the detected synchronization signal block. In other words, as the first step 701 of the random access procedure, the UE transmits a random access preamble (or message 1) to the base station. Then, the base station measures a transmission latency between the UE and the base station and performs uplink synchronization. Specifically, the UE transmits a random access preamble arbitrarily selected from a random access preamble set previously given by system information. The initial transmission power of the random access preamble is determined according to the pathloss between the base station and the UE measured by the UE. Further, the UE may determine the transmission beam direction (or transmission beam or beam) of the random access preamble based on the synchronization signal block received from the base station, apply the determined transmission beam direction, and transmit the random access preamble.

In the second step 702, the base station transmits a response (random access response, RAR, or message 2) to the detected random access attempt to the UE. The base station transmits an uplink transmission timing control command to the UE from the transmission latency measured from the random access preamble received in the first step (701). Further, the base station transmits an uplink resource and power control command to be used by the UE as scheduling information. The scheduling information may include control information for the uplink transmission beam of the UE. The RAR is transmitted through the PDSCH and may include at least one of the following information.

Random access preamble sequence index detected by the network (or base station)
Temporary cell radio network temporary identifier (TC-RNTI)
Uplink scheduling grant
Timing advance value If the UE does not receive the RAR, which is scheduling information for message 3, from the base station for a predetermined time in the second step 702, the UE proceeds back to the first step 701. Upon again performing the first step, the UE increases the transmission power of the random access preamble by a predetermined step and transmits it (this is referred to as power ramping), thereby increasing the probability of the base station to receive the random access preamble.

In the third step 703, the UE transmits, to the base station, uplink information (scheduled transmission or message 3) including its own UE identifier (which may be referred to as a UE contention resolution identity) (or, a valid UE identifier if the UE has the valid UE identifier (C-RNTI) in the cell before starting the random access procedure) through the uplink data channel (physical uplink shared channel (PUSCH) using the uplink resource allocated by the base station in the second step 702. The transmission timing of the uplink data channel for transmitting the message 3 follows the uplink transmission timing control command received from the base station in the second step (702). Further, the transmission power of the uplink data channel for transmitting the message 3 is determined considering the power control command received from the base station in the second step 702 and the power ramping value of the random access preamble. The uplink data channel for transmitting the message 3 is the first uplink data signal transmitted by the UE to the base station after the UE transmits the random access preamble.

Finally, if the base station determines that the UE has performed random access without collision with other UEs in the fourth step 704, the base station transmits, to the UE, a message (contention resolution message or CR message, or message 4) including the identifier of the UE that has transmitted the uplink data in the third step 703. In this regard, if a plurality of UEs receive the same TC-RNTI in the second step 702, each of the plurality of UEs that have received the same TC-RNTI transmits message 3 including its UE identifier (UE contention resolution identity) in the third step 703 to the base station, and the base station transmits message 4 including one of the identifiers of the plurality of UEs to resolve the contention. When the UE receives message 4 (CR message) including its UE identifier from the base station in the fourth step 704 (or if message 3 including the UE identifier (C-RNTI) is transmitted in the third step 703, and UE specific control information including a UE identifier (C-RNTI)-based CRC is received via PDCCH in the fourth step 704), the UE determines that random access has succeeded. Accordingly, it may be identified that among the plurality of UEs that have received the same TC-RNTI from the base station, a UE that has identified that its UE identifier is included in message 4 (CR message) has succeeded in contention. The UE transmits an HARQ-ACK/NACK indicating whether the message 4 has been successfully received to the base station through the physical uplink control channel (PUCCH).

If the base station fails to receive a data signal from the UE because the data transmitted by the UE in the third step 703 and data from another UE collide with each other, the base station does not perform any further data transmission to the UE. Accordingly, if the UE fails to receive the data transmitted from the base station in the fourth step 704 for a predetermined period of time, it is determined that the random access procedure has failed and starts again from the first step 701.

As described above, in the first step 701 of the random access procedure, the UE may transmit the random access preamble on the PRACH. There are 64 available preamble sequences in each cell, and 4 long preamble formats and 9 short preamble formats may be used according to the transmission type. The UE generates 64 preamble sequences using the root sequence index and cyclic shift value signaled as system information and randomly selects one sequence and uses it as a preamble.

The base station may provide the UE with control information (or configuration information) indicating which time-frequency resources may be used for PRACH, via at least one of the SIB, higher layer signaling (radio resource control (RRC) information), or downlink control information (DCI). Frequency resources for PRACH transmission indicate to the UE the start RB point of transmission, and the number of RBs used is determined according to the preamble format transmitted through the PRACH and the applied subcarrier spacing. The time resource for PRACH transmission may make known a preset PRACH configuration period, a subframe index and start symbol including a PRACH transmission time (PRACH occasion, which may be interchangeably used with a transmission time), and the number of PRACH transmission times in the slot as illustrated in Table 4 below, via the PRACH configuration index (0 to 255). Through the PRACH configuration index, the random access configuration information included in the SIB, and the index of the SSB selected by the UE, the UE may identify the time and frequency resources for transmitting the random access preamble, and transmit the selected sequence, as the preamble, to the base station.

TABLE 4

| PRACH configuration index | Preamble format | $N_{SFN}$ | | Subframe number | Starting symbol | Number of PRACH slots within a subframe | Number of time-domain PRACH occasions within a PRACH slot | PRACH duration |
|---|---|---|---|---|---|---|---|---|
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| 5 | 0 | 8 | 1 | 4 | 0 | — | — | 0 |
| 6 | 0 | 8 | 1 | 7 | 0 | — | — | 0 |
| 7 | 0 | 8 | 1 | 9 | 0 | — | — | 0 |
| 8 | 0 | 4 | 1 | 1 | 0 | — | — | 0 |
| 9 | 0 | 4 | 1 | 4 | 0 | — | — | 0 |
| 10 | 0 | 4 | 1 | 7 | 0 | — | — | 0 |
| ... | | | | ... | | | | |
| 104 | A1 | 1 | 0 | 1, 4, 7 | 0 | 2 | 6 | 2 |
| ... | | | | ... | | | | |
| 251 | C | 1 | 0 | 2, 7 | 0 | 2 | 2 | 6 |
| 252 | C2 | 1 | 0 | 1, 4, 7 | 0 | 2 | 2 | 6 |
| 253 | C2 | 1 | 0 | 0, 2, 4, 6, 8 | 0 | 2 | 2 | 6 |
| 254 | C2 | 1 | 0 | 0, 1, 2, 3, 4, 5, 6, 7, 8, 9 | 0 | 2 | 2 | 6 |
| 255 | C2 | 1 | 0 | 1, 3, 5, 7, 9 | 0 | 2 | 2 | 6 |

Meanwhile, to support application services, e.g., Internet of things (IoT), in the LTE communication system, LTE-MTC (machine-type communication) technology has been developed. LTE-MTC is an IoT-dedicated access technology in which low-power design, low-cost equipment, low construction cost, stable coverage, and large-scale UE access implementation are considered as key requirements. LTE-MTC technology ensures a long battery life for UEs based on a low-power design by reducing the transmission rate and transmission bandwidth compared to the LTE service and introducing a power saving mode. The transmission rate and transmission bandwidth greatly reduce, and so does the complexity of the communication modem. Thus, it is possible to implement a low-cost UE. Further, LTE-MTC may adopt a single-antenna technology, rather than multi-antenna (MIMO) technology, minimizing power consumption. Further, since the existing LTE network may be used as it is, the legacy LTE service and LTE-MTC service may be supported simultaneously without additional investment.

To have no influence on the UE receiving the legacy LTE service, the base station includes additional information in reserved bits of the MIB included in the PBCH for the legacy LTE service, indicating that the cell transmitting the PBCH also supports the LTE-MTC service and indirectly indicating the position of the resource in which the system information block (system information block type 1-bandwidth reduced, SIB1-BR) for LTE-MTC service. By so doing, the UE or nodes receiving the LTE-MTC service may determine whether the cell found through the cell search is a cell supporting the LTE-MTC service or not, and if the cell also supports the LTE-MTC service, may obtain the position of the resource where the corresponding system information block may be received. Further, the UE supported by the legacy LTE service may receive the LTE service without an additional operation or a new operation, further to the existing operation.

A UE supporting the LTE-MTC service (hereinafter referred to as an MTC UE) may perform a random access procedure based on the various system information received. Additionally, in the first step 701 of the random access procedure described in connection with FIG. 7, the MTC UE determines a coverage enhancement level (CE-level) before transmitting a random access preamble (hereinafter, interchangeably used with PRACH, PRACH preamble, or preamble). As in the description of the LTE-MTC service, the MTC UE may repeatedly transmit the random access preamble several times so that the UEs at the cell edge may also succeed in random access so as to increase coverage. However, since the UEs in the cell center do not need to repeatedly transmit the random access preamble, multiple CE levels may be set so that the number of repetitions of the random access preamble applied to each MTC UE, the time resource, the frequency resource, and the preamble sequence resources may be configured differently. Embodiments of the disclosure may be applied to UEs supporting the LTE-MTC service as well as 5G UEs.

Meanwhile, to reduce the complexity of RedCap UEs according to an embodiment of the disclosure, a half-duplex operation (or half-duplex communication) for operating without a duplexer in a frequency division duplex (FDD) or time division duplex (TDD) system may be considered. Therefore, a communication method for a RedCap UE to perform a half-duplex operation in an FDD or TDD system is required. Further, the RedCap UE requires random access with minimized latency when performing a half-duplex operation.

According to the disclosure, proposed below is a method for a cell or a base station to recognize a reduced-capability (RedCap) UE during an initial access process of the RedCap UE (or half-duplex communication UE). In initial cell access to a cell (or base station), the RedCap UE obtains cell synchronization by receiving a synchronization block as described above in connection with the embodiments of FIG. 4 or 5, then determines whether the cell supports the RedCap UE by obtaining an MIB or SIB or via a random access procedure and, upon determining that the cell supports the RedCap UE, may inform the base station that the UE attempting access is a RedCap UE by transmitting, to the base station, capability information including at least one or more of the bandwidth size supported by the RedCap UE in the cell, whether half-duplex operation or full-duplex operation is supported, and the number of transmission or reception antennas equipped (or supported). Thereafter, the RedCap UE may finish the random access procedure and proceed to an RRC connected mode for transmitting/receiving data to/from the cell.

Described below are issues that may arise while the RedCap UE performs random access, in connection with FIG. 8.

Figure 8:
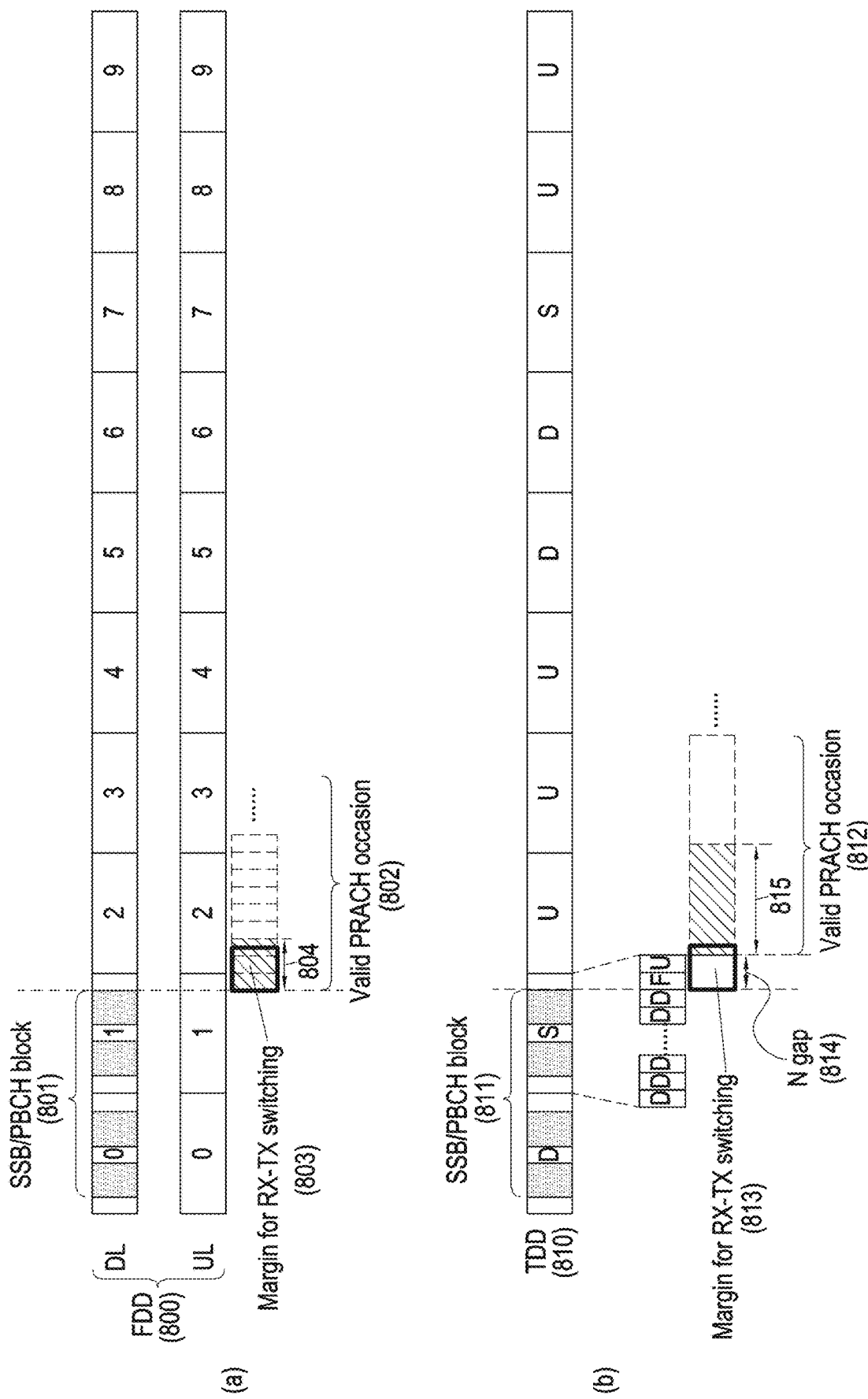
FIG. 8 illustrates a view of an example in which a RedCap UE supporting half-duplex communication in a wireless communication system cannot transmit a random access preamble on a valid random access occasion according to an embodiment.

FIG. 8 illustrates a view of an example in which a RedCap UE supporting half-duplex communication in a wireless communication system cannot transmit a random access preamble on a valid random access transmission occasion according to an embodiment. See the NR standards including TS 38.211 for FDD and TDD frame architectures in 5G systems.

Since the half-duplex communication UE lacks a duplexer, it requires an RF switching gap for changing the RF between transmission and reception when operating in the FDD 800.

FIG. 8(*a*) illustrates an RF switching gap 803 (shown in a thick box) required for the half-duplex communication UE between a synchronization signal block 801 and a valid random access transmission occasion 802 in the FDD 800. The half-duplex communication UE may change the RF from reception to transmission during the RF switching gap 803 after receiving the synchronization signal block 801. In this case, since all of the slots of the uplink carrier of the FDD 800 are defined as valid random access transmission occasions, the half-duplex communication UE may not perform random access transmission on the valid random access transmission occasion 804 while switching RF (during a time corresponding to the RF switching gap 803). As described in connection with FIG. 9, since valid random access transmission occasions are mapped with the index of the synchronization signal block 801 received by the half-duplex communication UE, if the half-duplex communication UE fails to perform random access transmission on the valid random access transmission occasion 804 overlapping the RF switching gap 803, random access transmission may be delayed until a valid random access transmission occasion mapped with the index of the synchronization signal block received by the UE reappears.

In the TDD 810, $N_{gap}$ 814, an interval for switching RF between the synchronization signal block and the valid random access occasion, may exist. However, $N_{gap}$ 814 may not be sufficient as a switching gap for switching the RF between transmission and reception of the half-duplex communication UE. FIG. 8(*b*) illustrates an RF switching gap 813 (shown in a thick box) required for half-duplex communication UE and $N_{gap}$ 814 present for the legacy NR (5G) TDD UE to leave a distance between the synchronization signal block 811 and the valid random access transmission occasion 812 in the TDD 810. The control information (or configuration information) for the RF switching gap 813 required for the half-duplex communication UE may be received by the UE from the base station via at least one of the SIB, higher layer signaling (RRC information), or DCI, and may be defined for two frequency bands, frequency range 1 (FR1) (below 6 GHz) and frequency range 2 (FR2) (above 24 GHz), for use in the 5G system in the 3GPP standard. The half-duplex communication UE may change the RF from reception to transmission during the RF switching gap 813 after receiving the synchronization signal block 811. In this case, since the uplink symbols, Ngap 814 immediately after transmission of the synchronization signal block 811 of the TDD 810 is finished, are defined as valid random access transmission occasions, the half-duplex communication UE is unable to perform random access transmission on the valid random access transmission occasion 815 during RF switching gap 813. As described in connection with FIG. 9, since valid random access transmission occasions are mapped with the index of the synchronization signal block 811 received by the half-duplex communication UE, if random access transmission is not performed on the valid random access transmission occasion 815 overlapping the RF switching gap 813, random access transmission may be delayed until a valid random access transmission occasion mapped with the index of the synchronization signal block received by the UE reappears. This issue arises in the TDD 810 as well. Hereinafter, the random access transmission occasion is simply referred to as a random access occasion.

A mapping relationship between the index of a synchronization signal block and a valid random access occasion is described below with reference to FIG. 9.

First, in the 5G system, the UE receives the synchronization signal block and may thereby be set with control resource set (CORESET) #0 (which may correspond to the control resource set whose control resource set index or identity (ID) is 0) and search space #0 (which may correspond to a search space whose search space index or ID is 0). The UE may perform monitoring on control resource set #0, assuming that the selected synchronization signal block and DMRS transmitted in control resource set #0 are quasi co-located (QCLed). The UE may receive system information based on the downlink control information transmitted in control resource set #0. The UE may obtain PRACH-related configuration information for random access from the received system information. The UE, which obtains the PRACH-related configuration information, may transmit a preamble to the base station in the PRACH based on the index of the received synchronization signal block upon performing random access (that is, the UE transmits a preamble in the PRACH using a transmission beam QCLed with the reception beam when receiving the synchronization signal block having the index), and the base station, which receives the preamble via the PRACH, may obtain information for the synchronization signal block selected (received) by the UE. In other words, the UE transmits the PRACH preamble for random access on the random access occasion mapped with the index of the received synchronization signal block.

Figure 9:
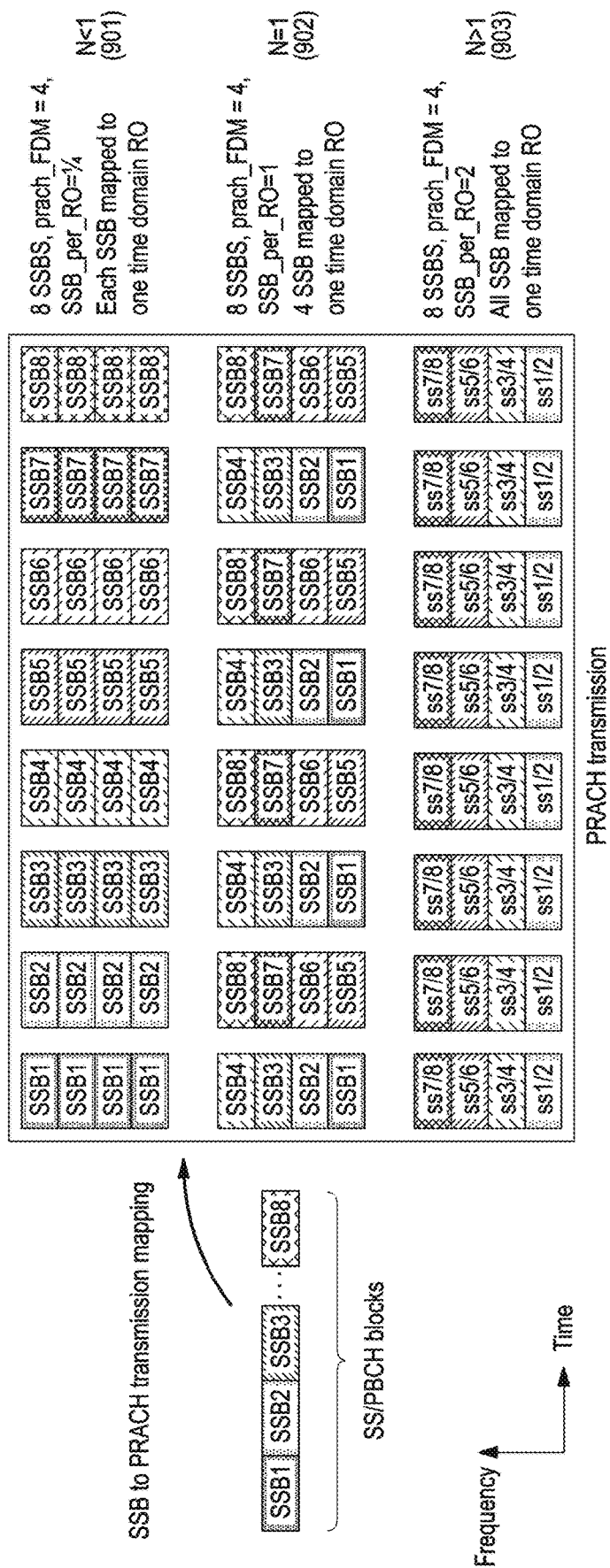
FIG. 9 illustrates a view of a relationship between a synchronization signal block and a valid random access occasion in a wireless communication system according to an embodiment.

FIG. 9 illustrates a view of a relationship between a synchronization signal block and a valid random access occasion in a wireless communication system according to an embodiment.

In FIG. 9, each SSB #i is index #i of each synchronization signal block described in connection with FIG. 4 or FIG. 5. In FIG. 9, N is the number of synchronization signal blocks mapped to one random access occasion, indicating that four random access occasions are frequency-multiplexed in one time interval (e.g., an interval of at least one symbol, at least one slot, or at least one subframe). As an example case where N is less than 1 (N<1, 901), four random access occasions multiplexed in the frequency domain are mapped to one synchronization signal block. In other words, one random access occasion is mapped to ¼ of one synchronization signal block. As an example case where N is 1 (N=1, 902), four random access occasions multiplexed in the frequency domain are mapped to four synchronization signal blocks. In other words, in this case, one random access occasion may be mapped to one synchronization signal block.

Next, as an example case where N is larger than 1 (N>1, 903), four frequency-multiplexed random access occasions are mapped to eight synchronization signal blocks (SSB #1 to SSB #8) (SSB is simply denoted as SS in FIG. 9). In other words, in this case, one random access occasion is mapped to two synchronization signal blocks.

When N is less than 1 (N<1, 901) or when N is 1 (N=1, 902), the half-duplex communication UE receives synchronization signal block 1 (SSB #1) but is unable to perform random access transmission on the first valid random access occasion of FIG. 9 due to RF switching as illustrated in FIG. 8, the half-duplex communication UE is unable to perform random access transmission until the next random access occasion mapped to synchronization signal block 1 (SSB #1) appears.

To address such issue, the following embodiment of the disclosure is proposed.

According to the disclosure, the base station may configure a separate random access resource for the RedCap UE or each of a RedCap UE supporting full-duplex and a RedCap UE supporting half-duplex and transmit configuration information for the random access resource to the RedCap UE via system information, and upon receiving the system information, the RedCap UE may apply each or a combination of the first and second embodiments described below to the random access resource. As is well known, full-duplex communication refers to a communication scheme in which transmission and reception may be performed simultaneously, and half-duplex communication refers to a communication scheme in which transmission and reception may be performed, but not simultaneously. In half-duplex communication, a switch between transmission and reception is required.

The system information for transmitting the information for the random access resource may be system information transmitted separately from system information for a UE supporting a different version of standard within the cell, and the base station configures separate random access resources for the RedCap UE and the UE supporting the different version of standard, thereby rendering it possible to identify which one of the RedCap UE and the UE supporting the different version of standard performs random access. Further, for a wireless communication system using a hybrid of FDD and TDD, the first and second embodiments described below may be combined.

In the first embodiment, there is proposed a scheme for addressing random access transmission latency on the valid random access occasion mapped with the index of the synchronization signal block received by the RedCap UE and ensuring an RF switching gap required for half-duplex communication of the RedCap UE in addition to $N_{gap}$ present for the UE in the case of the legacy NR TDD described above in connection with FIG. 8 when the UE reports RedCap-related UE capability to the base station, and the RedCap UE performs communication with the base station in a half-duplex operation. In this embodiment, the RedCap UE may determine that the random access occasion within the RF switching gap (or overlapping the RF switching gap in the time domain) is invalid. In this case, the RedCap UE determines preamble transmission in random access based on mapping between the index of the synchronization signal block and the next valid random access occasion while excluding the invalid random access occasion which overlaps the RF switching gap in the time domain. Thus, the random access transmission latency described in connection with FIGS. 8 and 9 may be addressed.

Figure 10:
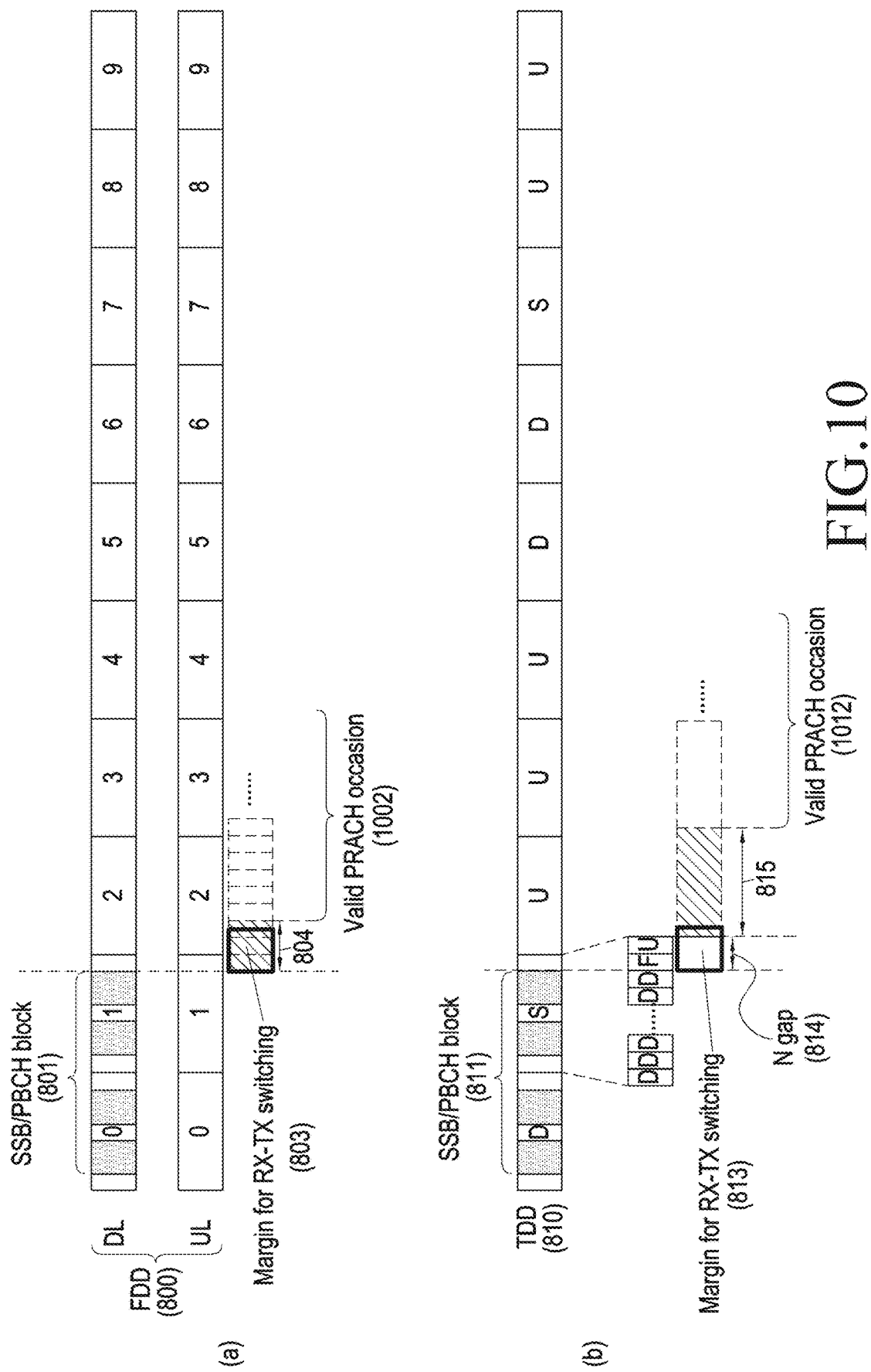
FIG. 10 illustrates a view of an example of a random access resource allocation method for a RedCap UE according to an embodiment.

Meanwhile, as in the example of FIG. 10 to be described below, $N_{gap}$ 814 may include an RF switching gap 1023 required for half-duplex communication of the RedCap UE. In this case, the RedCap UE may determine that the random access occasion within $N_{gap}$ 814 (or overlapping $N_{gap}$ in the time domain) is invalid. Alternatively, the RedCap UE may determine that the random access occasion in the random access slot is valid when the following [condition] is met. The example of FIG. 10 may be likewise applied to a wireless communication system using a hybrid of FDD and TDD as described above. In other words, although the example of FIG. 10 is described in connection with TDD, the same may also be applied to FDD.

[Condition]: The random access occasion does not exist in front of the synchronization signal block in the random access slot, and the random access occasion 1022 begins symbol(s) of at least $N_{gap}$ 814 after the last symbol where the synchronization signal block 811 has been transmitted. Alternatively, the random access occasion 1022 may begin a predetermined offset after the symbol(s) of $N_{gap}$ 814.

Next, $N_{gap}$ may be defined as follows.

For example, in the case of a B4 format PRACH (random access) preamble in Table 6.3.3.1-2 of TS38.211, $N_{gap}$ is 0 symbols and, in the case where the subcarrier spacing (SCS) of the PRACH in Table 6.3.3.1-1 of TS38.211 is 1.25 kHz or 5 kHz, $N_{gap}$ is 0 symbols. In standard TS38.211 Table 6.3.3.1-2, if the SCS of the PRACH preamble is 15 kHz, 30 kHz, 60 kHz, or 120 kHz, $N_{gap}$ is 2 symbols. In other words, in the case of the PRACH preamble in standard TS38.211 Table 6.3.3.1-1 used only for FR1, $N_{gap}$ is 0 symbol and, in the case of the PRACH preamble used for FR1 when the SCS is 15 kHz or 30 kHz or FR2 when the SCS is 60 kHz or 120 kHz in Table 6.3.3.1-2 of standard TS38.211, $N_{gap}$ is 2 symbols.

The first embodiment may be applied when the RedCap UE supporting half-duplex communication determines that the carrier or cell receiving the synchronization signal block is a TDD or unpaired spectrum or when a specific carrier or cell is a TDD or unpaired spectrum from the received system information. In the NR standard, TDD is sometimes referred to as an unpaired spectrum as set forth in TS 38.213. Alternatively, when the RedCap UE supporting half-duplex communication determines that the carrier or cell receiving the synchronization signal block is a FDD or paired spectrum or when a specific carrier or cell is a FDD or paired spectrum from the received system information, the first embodiment may be applied to determine whether the random access occasion on the uplink frequency is valid.

A RedCap UE supporting full-duplex communication or half-duplex communication may determine that all the random access occasions are valid on the uplink frequency of the FDD cell, each time.

In the second embodiment, there is proposed a scheme for addressing random access transmission latency on the valid random access occasion mapped with the index of the synchronization signal block received by the RedCap UE and ensuring an RF switching gap required for half-duplex communication of the RedCap UE in the case of the legacy NR FDD described above in connection with FIG. 8 when the UE reports RedCap-related UE capability to the base station, and the RedCap UE performs communication with the base station in a half-duplex operation. In this embodiment, the RedCap UE may determine that the random access occasion within the RF switching gap (or overlapping the RF switching gap in the time domain) is invalid. Thus, the RedCap UE determines to perform random access based on mapping between the index of the synchronization signal block and the next valid random access occasion while excluding the invalid random access occasion which temporally overlaps the RF switching gap. Thus, the random access transmission latency described in connection with FIGS. 8 and 9 may be addressed. The second embodiment may be applied when the RedCap UE determines that the carrier or cell receiving the synchronization signal block is an FDD or paired spectrum or when a specific carrier or cell is an FDD or paired spectrum from the received system information.

FIG. 10 illustrates a view of an example of a random access resource allocation method for a RedCap UE according to an embodiment.

(a) of FIG. 10 illustrates an example resource allocation method to allow random access to be performed on the next valid random access occasion 1002 mapped with the index of the synchronization signal block, except for the random access occasion 803 overlapping the RF switching gap 803 in the time domain in the second embodiment for NR FDD described above.

(b) of FIG. 10 illustrates an example resource allocation method to allow random access to be performed on the next valid random access occasion 1012 mapped with the index of the synchronization signal block, except for the random access occasion 815 overlapping the RF switching gap 813 in the time domain in the first embodiment for NR TDD described above.

FIG. 10 illustrates an example resource allocation method to allow random access to be performed on the random access occasion 1022, at least symbol(s) of $N_{gap}$ 814 after the last symbol where the synchronization signal block 811 has been transmitted in the case where $N_{gap}$ 814 includes the RF switching gap 1023 in the first embodiment for NR TDD.

Figure 11:
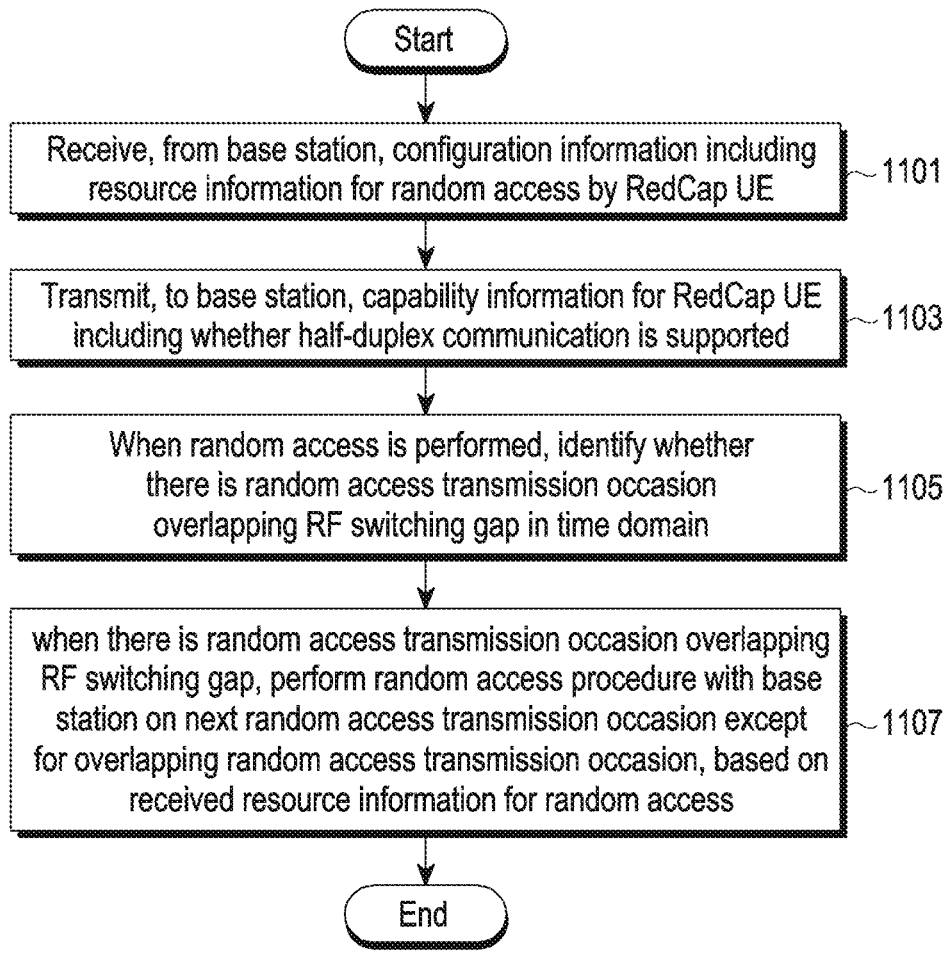
FIG. 11 illustrates a view of a method in which a RedCap UE performs a random access procedure in a wireless communication system according to an embodiment.

FIG. 11 illustrates a view of a method in which a RedCap UE performs a random access procedure in a wireless communication system according to an embodiment. The method for FIG. 11 may be applied to the above-described first and second embodiments.

In operation 1101, the RedCap UE receives, from the base station, configuration information including resource information for random access by the RedCap UE. The configuration information may be provided to the UE through SIB or RRC information or DCI. In operation 1103, the RedCap UE transmits, to the base station, capability information for the RedCap UE including whether or not half-duplex communication is supported. In this embodiment, it is assumed that the RedCap UE supports half-duplex communication. In operation 1105, when the RedCap UE performs random access, the RedCap UE identifies whether there is a random access transmission occasion overlapping the RF switching gap in the time domain. In operation 1107, when there is a random access transmission occasion overlapping the RF switching gap, the RedCap UE performs a random access procedure with the base station on the next random access transmission occasion, except for the overlapping random access transmission occasion, based on the received resource information for random access. If the resource information for random access is previously configured so that the RF switching gap does not overlap the random access transmission occasion, operation 1105 may be omitted, and the UE may immediately perform a random access procedure based on the resource information.

The next random access transmission occasion is described. As described above in connection with FIG. 8, reference numbers 804 and 815 are random access occasions overlapping the RF switching gaps 803 and 813, and in the example of FIG. 10, the resources of the next valid random access occasions 1002 and 1012 may be allocated (configured) based on the resource information for random access in operation 1101 described above. For example, the resources of the next valid random access occasions 1002 and 1012 may be allocated (configured) during a predetermined time period (e.g., a period of at least one symbol, at least one slot, or at least one subframe) from the first symbol after the overlapping random access occasions 804 and 815. Alternatively, the resources of the next valid random access occasions 1002 and 1012 may be allocated (configured) a predetermined offset after the overlapping random access occasions 804 and 815.

Figure 12:
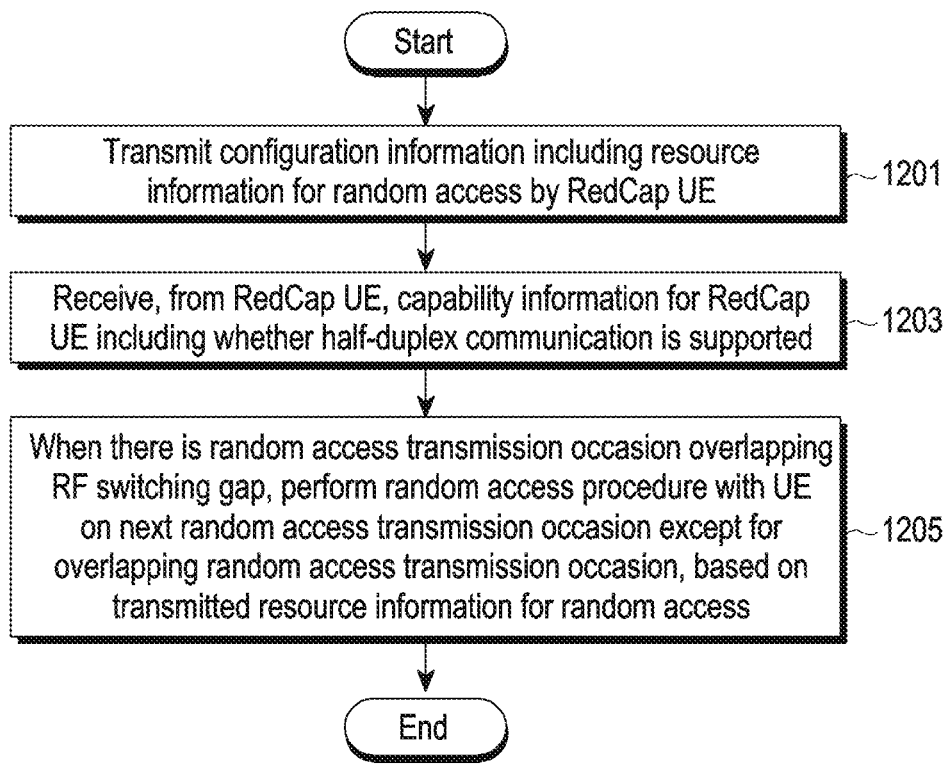
FIG. 12 illustrates a view of a method in which a base station performs a random access procedure for a RedCap UE in a wireless communication system according to an embodiment.

FIG. 12 illustrates a view of a method in which a base station performs a random access procedure for a RedCap UE in a wireless communication system according to an embodiment. The method for FIG. 12 may be applied to the above-described first and second embodiments.

Referring to FIG. 12, in operation 1201, the base station transmits configuration information including resource information for random access by the RedCap UE. In operation 1203, the base station receives, from the UE, capability information for the RedCap UE including whether half-duplex communication is supported. In operation 1205, when there is a random access occasion overlapping the RF switching gap, the base station, which has identified the capability information for the RedCap UE, performs a random access procedure with the UE on the next random access transmission occasion, except for the overlapping random access transmission occasion, based on the transmitted resource information for random access.

In a third embodiment, the base station configures no separate random access resource for the RedCap UE but rather configures a common random access resource for all the UEs in the cell. In this case, configuration information for the random access resource may be transmitted, via system information, to all of the UEs in the cell, and upon receiving the system information, the UE may perform the following operation on the random access resource.

In the third embodiment, when the base station determines that a RedCap UE exists in the cell and the RedCap UE is able to perform communication with the base station in a half-duplex operation by the capability information received from the UE, $N_{gap\_cell}$ which is similar to Ngap 814 present for the UE in the case of the legacy NR TDD described above in connection with FIG. 8 may be applied to all the UEs in the cell. However, $N_{gap\_cell}$ may be a value including the RF switching gap required for half-duplex communication of the RedCap UE, other than $N_{gap}$ present for the UE in the case of legacy NR TDD. Alternatively, $N_{gap\_cell}$ may be identical to $N_{gap}$. Therefore, $N_{gap\_cell}$ may be signaled to all the UEs in the cell as system information, and all the UEs in the cell, receiving the system information may determine that the random access occasion within $N_{gap\_cell}$ (or overlapping $N_{gap\_cell}$ in the time domain) is invalid. Therefore, the RedCap UE may determine preamble transmission for random access based on mapping between the index of the synchronization signal block and the next valid random access occasion, except for the invalid random access occasion overlapping $N_{gap\_cell}$ in the time domain, as described above. Therefore, according to the above-described embodiments, the random access transmission latency described above in connection with FIGS. 8 and 9 may be addressed. Since the third embodiment is commonly applied to all of the UEs in the cell, there may be an advantage in that no separate random access transmission resource is required only for the RedCap UE.

Figure 13:
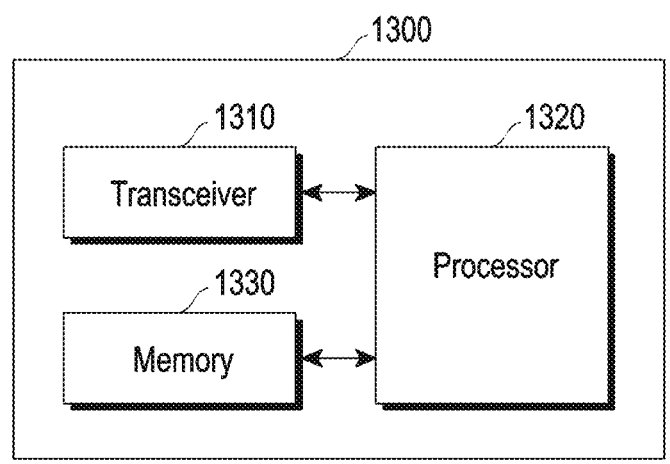
FIG. 13 illustrates a block diagram of a UE according to an embodiment.

FIG. 13 illustrates a block diagram of a configuration of a RedCap UE or a normal UE performing operations according to an embodiment.

Referring to FIG. 13, a UE 1300 may include a transceiver 1310, a processor 1320, and a memory 1330. In a wireless communication system described above in connection with FIGS. 1 to 9, according to the disclosure, the UE 1300 may be operated in the manners described above in connection with FIGS. 10A and 10B to 12. However, the components of the UE 1300 are not limited thereto. According to an embodiment, the UE 1300 may include more components than those described above or, if the UE 1300 is a RedCap UE, the UE 1300 may include fewer components. According to an embodiment, the transceiver 1310, the processor 1320, and the memory 1330 may be implemented in the form of a single chip.

According to an embodiment, the transceiver 1310 may include a transmitter and a receiver. The transceiver 1310 may transmit and receive signals to/from a base station. The signals may include control information and data. To that end, the transceiver 1310 may include a radio frequency (RF) transmitter for frequency-up converting and amplifying signals transmitted and an RF receiver for low-noise amplifying signals received and frequency-down converting the frequency of the received signals. The transceiver 1310 may receive signals via a radio channel, output the signals to the processor 1320, and transmit signals output from the processor 1320 via a radio channel.

The processor 1320 may control a series of operations to allow the UE 1300 to operate as per the above-described embodiments. For example, the processor 1320 may differently control random access preamble transmission methods according to an embodiment, e.g., a resource and transmission configuration method for transmission of a random access preamble corresponding to a low-complexity service, and a method for determining a configuration and random access preamble transmission resource of a UE corresponding thereto.

The memory 1330 may store data or control information, such as the random access preamble transmission resource configuration, included in the signal obtained by the UE 1300 and may have an area for storing data necessary for the processor 1320 to control and generated while being controlled by the processor 1320.

Figure 14:
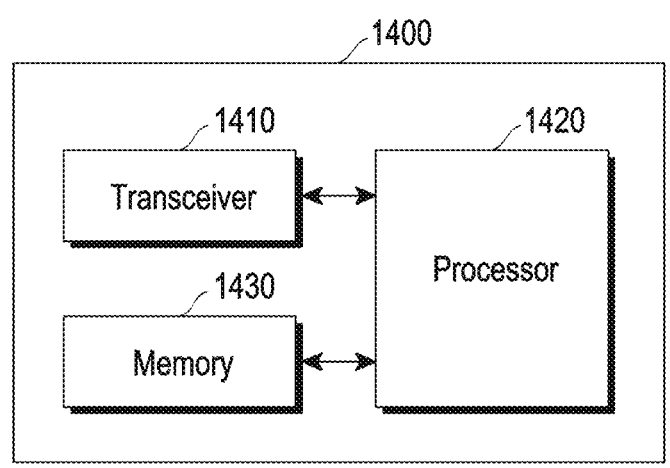
FIG. 14 illustrates a block diagram of a base station according to an embodiment.

FIG. 14 illustrates a block diagram of a configuration of a base station performing operations according to an embodiment.

Referring to FIG. 14, a base station 1400 may include a transceiver 1410, a processor 1420, and a memory 1430. In a wireless communication system described above in connection with FIGS. 1 to 9, according to the disclosure, the base station 1400 may be operated in the manners described above in connection with FIGS. 10A and 10B to 12. However, the components of the base station 1400 are not limited thereto. According to an embodiment, the base station 1400 may include more or fewer components than the above-described components. According to an embodiment, the transceiver 1410, the processor 1420, and the memory 1430 may be implemented in the form of a single chip. According to an embodiment, the transceiver 1410 may include a transmitter and a receiver. The transceiver 1410 may transmit and receive signals to/from a UE. The signals may include control information and data. To that end, the transceiver 1410 may include a radio frequency (RF) transmitter for frequency-up converting and amplifying signals transmitted and an RF receiver for low-noise amplifying signals received and frequency-down converting the frequency of the received signals. The transceiver 1410 may receive signals via a radio channel, output the signals to the processor 1420, and transmit signals output from the processor 1420 via a radio channel.

The processor 1420 may control a series of operations to allow the base station 1400 to operate as per the above-described embodiments. For example, the processor 1420 may differently control random access preamble transmission methods according to an embodiment, e.g., a resource and transmission configuration method for transmission of a random access preamble corresponding to a low-complexity service, and a method for determining a configuration and random access preamble transmission resource of a UE corresponding thereto.

The memory 1430 may store data or control information, such as the random access preamble transmission resource configuration, determined by the base station 1400 or data or control information received from the UE and may have an area for storing data necessary for the processor 1420 to control and generated while being controlled by the processor 1420.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for performing a random access procedure by a user equipment (UE) with a reduced-capability in a wireless communication system, the method comprising:
   receiving, from a base station, configuration information including resource information for random access of the UE;
   identifying whether there is a random access occasion overlapping a radio frequency (RF) switching gap for the UE in a time domain in case that the random access is performed, the random access occasion being configured for the UE, the RF switching gap being a time period in which the UE using half-duplex communication changes between a transmission and a reception in the UE; and
   in case that there is the random access occasion overlapping the RF switching gap, performing the random access procedure with the base station on a next valid random access occasion except for the overlapping random access occasion, based on the received resource information for the random access,
   wherein the next valid random access occasion is mapped with an index of a synchronization signal block received by the UE, and
   wherein the next valid random access occasion is configured during a predetermined time period from a first symbol after the overlapping random access occasion.

2. The method of claim 1, wherein:
   performing the random access procedure includes transmitting a message including a preamble for the random access using a resource of the next valid random access occasion configured based on the resource information.

3. The method of claim 1, wherein the UE determines that all random access occasions are valid at an uplink frequency of a frequency division duplex (FDD) cell.

4. The method of claim 1, wherein:
   the UE communicates with the base station using at least one of an FDD scheme or a time division duplex (TDD) scheme, and
   the RF switching gap for half-duplex communication of the UE includes an interval available for RF switching of the UE between a synchronization signal block and a valid random access occasion.

5. A user equipment (UE) with a reduced-capability in a wireless communication system, the UE comprising:
   a transceiver; and
   a processor configured to:
      receive, from a base station through the transceiver, configuration information including resource information for random access of the UE;
      identify whether there is a random access occasion overlapping a radio frequency (RF) switching gap for the UE in a time domain in case that the random access is performed, the random access occasion being configured for the UE, the RF switching gap being a time period in which the UE using half-duplex communication changes between a transmission and a reception in the UE; and
      in case that there is the random access occasion overlapping the RF switching gap, perform a random access procedure with the base station, through the transceiver, on a next valid random access occasion except for the overlapping random access occasion, based on the received resource information for the random access,
   wherein the next valid random access occasion is mapped with an index of a synchronization signal block received by the UE, and
   wherein the next valid random access occasion is configured during a predetermined time period from a first symbol after the overlapping random access occasion.

6. The UE of claim 5, wherein:
   the processor is configured to transmit, through the transceiver, a message including a preamble for the random access using a resource of the next valid random access occasion configured based on the resource information.

7. The UE of claim 5, wherein:
   the processor is configured to determine that all random access occasions are valid at an uplink frequency of a frequency division duplex (FDD) cell.

8. The UE of claim 5, wherein:
   the UE communicates with the base station using at least one of an FDD scheme or a time division duplex (TDD) scheme, and
   the RF switching gap for half-duplex communication of the UE includes an interval available for RF switching of the UE between a synchronization signal block and a valid random access occasion.

9. A method for performing a random access procedure by a base station in a wireless communication system, the method comprising:
   transmitting configuration information including resource information for random access of a user equipment (UE) with a reduced-capability; and
   in case that there is a random access occasion overlapping a radio frequency (RF) switching gap for the UE, the random access occasion being configured for the UE, the RF switching gap being a time period in which the UE using half-duplex communication changes between a transmission and a reception in the UE, performing the random access procedure with the UE on a next valid random access occasion except for the overlapping random access occasion, based on the transmitted resource information for the random access,
   wherein the next valid random access occasion is mapped with an index of a synchronization signal block received by the UE, and
   wherein the next valid random access occasion is configured during a predetermined time period from a first symbol after the overlapping random access occasion.

10. The method of claim 9, wherein:
performing the random access procedure includes receiving a message including a preamble for the random access using a resource of the next valid random access occasion configured based on the resource information.

11. The method of claim 9, wherein all random access occasions are valid at an uplink frequency of a frequency division duplex (FDD) cell.

12. The method of claim 9, wherein:
the base station communicates with the UE using at least one of an FDD scheme or a time division duplex (TDD) scheme, and
the RF switching gap for the half-duplex communication of the UE includes an interval available for RF switching of the UE between a synchronization signal block and a valid random access occasion.

13. A base station in a wireless communication system, the base station comprising:
a transceiver; and
a processor configured to:
 transmit, through the transceiver, configuration information including resource information for random access by a user equipment (UE) with a reduced-capability, and
 in case that there is a random access occasion overlapping a radio frequency (RF) switching gap for the UE, the random access occasion being configured for the UE, the RF switching gap being a time period in which the UE using half-duplex communication changes between a transmission and a reception in the UE, perform a random access procedure with the UE, via the transceiver, on a next valid random access occasion except for the overlapping random access occasion, based on the transmitted resource information for the random access,
wherein the next valid random access occasion is mapped with an index of a synchronization signal block received by the UE, and
wherein the next valid random access occasion is configured during a predetermined time period from a first symbol after the overlapping random access occasion.

14. The base station of claim 13, wherein:
the processor is configured to receive, through the transceiver, a message including a preamble for the random access using a resource of the next valid random access occasion configured based on the resource information.

15. The base station of claim 13, wherein all random access occasions are valid at an uplink frequency of a frequency division duplex (FDD) cell.

16. The base station of claim 13, wherein:
the base station communicates with the UE using at least one of an FDD scheme or a time division duplex (TDD) scheme, and
the RF switching gap for the half-duplex communication of the UE includes an interval available for RF switching of the UE between a synchronization signal block and a valid random access occasion.

* * * * *